(12) United States Patent
Hiraoka et al.

(10) Patent No.: US 11,721,966 B2
(45) Date of Patent: Aug. 8, 2023

(54) SUPPORTING MEMBER, CONDUIT SUPPORTING DEVICE, AND PROCESSING APPARATUS PROVIDED THEREWITH

(71) Applicant: JUNKOSHA INC., Ibaraki (JP)

(72) Inventors: Daiki Hiraoka, Ibaraki (JP); Hiroshi Takeuchi, Ibaraki (JP); Yasuhiro Misu, Ibaraki (JP); Tetsuya Hirose, Ibaraki (JP)

(73) Assignee: JUNKOSHA INC., Ibaraki (JP)

( * ) Notice: Subject to any disclaimer, the term of this patent is extended or adjusted under 35 U.S.C. 154(b) by 0 days.

(21) Appl. No.: 17/699,841

(22) Filed: Mar. 21, 2022

(65) Prior Publication Data

US 2022/0216683 A1    Jul. 7, 2022

Related U.S. Application Data

(63) Continuation of application No. 16/962,969, filed as application No. PCT/JP2019/001566 on Jan. 18, 2019, now Pat. No. 11,329,470.

(30) Foreign Application Priority Data

Jan. 19, 2018 (JP) .................................. 2018-007699
Oct. 18, 2018 (JP) .................................. 2018-196305

(51) Int. Cl.
H02G 11/00 (2006.01)
F16G 13/16 (2006.01)
H02G 3/04 (2006.01)

(52) U.S. Cl.
CPC ........... *H02G 11/006* (2013.01); *F16G 13/16* (2013.01); *H02G 3/0475* (2013.01)

(58) Field of Classification Search
CPC .... H02G 11/006; H02G 11/00; H02G 3/0475; F16G 13/16; B60R 16/0207; B60R 16/0215; B60R 16/027
See application file for complete search history.

(56) References Cited

U.S. PATENT DOCUMENTS 4,698,050 A * 10/1987 Hattori ................. F16G 5/16
                                                   474/201
6,215,068 B1    4/2001 Meier
(Continued)

FOREIGN PATENT DOCUMENTS

CN    101082361 A    12/2007
CN    102235550 A    11/2011
(Continued)

OTHER PUBLICATIONS

Feb. 26, 2019, International Search Report issued for related PCT application No. PCT/JP2019/001566.
(Continued)

*Primary Examiner* — Hoa C Nguyen
*Assistant Examiner* — Amol H Patel
(74) *Attorney, Agent, or Firm* — Paratus Law Group, PLLC

(57) ABSTRACT

There is provided a supporting member having excellent durability and an apparatus including the supporting member. The supporting member includes an elastic member and a plurality of block members formed thereon. The supporting member is deformable from a shape in which end surfaces of the block members are in contact with each other to a shape in which the end surfaces are separated from each other. The elastic member includes a fixed region whose deformation is restricted by being fixed to a bottom surface of the block member, and the supporting member includes a flexure reduction unit for reducing flexure at a position near the fixed region of the elastic member.

23 Claims, 18 Drawing Sheets

(56) References Cited

U.S. PATENT DOCUMENTS

| | | | |
|---|---|---|---|
| 6,708,480 | B1 | 3/2004 | Wehler |
| 2003/0042040 | A1 | 3/2003 | Komiya et al. |
| 2003/0182924 | A1 | 10/2003 | Tsutsumi et al. |
| 2004/0112625 | A1* | 6/2004 | Sheikholeslami ...... F16G 13/16 174/111 |
| 2005/0056333 | A1 | 3/2005 | Utaki |
| 2005/0274850 | A1* | 12/2005 | Blase .................... F16G 13/16 248/65 |
| 2007/0277499 | A1 | 12/2007 | Iwami et al. |
| 2008/0135119 | A1 | 6/2008 | Tonooka et al. |
| 2008/0236131 | A1 | 10/2008 | Komiya |
| 2011/0121141 | A1 | 5/2011 | Tatsuta et al. |
| 2011/0204190 | A1 | 8/2011 | Ikeda et al. |
| 2011/0240805 | A1 | 10/2011 | Komiya |
| 2012/0187271 | A1 | 7/2012 | Komiya |
| 2012/0205498 | A1 | 8/2012 | Komiya |
| 2012/0228437 | A1 | 9/2012 | Tatsuta et al. |
| 2014/0042280 | A1 | 2/2014 | Takeuchi et al. |
| 2014/0174783 | A1 | 6/2014 | Komiya |
| 2014/0182262 | A1 | 7/2014 | Komiya |
| 2014/0305672 | A1 | 10/2014 | Komiya |
| 2015/0179309 | A1* | 6/2015 | Shin ...................... H02G 11/00 174/135 |
| 2016/0178088 | A1 | 6/2016 | Stadler |
| 2016/0314871 | A1 | 10/2016 | Tetsuka et al. |
| 2017/0297514 | A1* | 10/2017 | Sekino ............... B60R 16/0215 |
| 2018/0047480 | A1 | 2/2018 | Sung |
| 2018/0114611 | A1 | 4/2018 | Tetsuka et al. |
| 2018/0126927 | A1* | 5/2018 | Sekino ............... B60R 16/0215 |
| 2018/0126928 | A1* | 5/2018 | Sekino ..................... B60J 5/06 |
| 2018/0128349 | A1 | 5/2018 | Tetsuka et al. |
| 2019/0077343 | A1* | 3/2019 | Kogure ................. B60R 16/03 |
| 2020/0144805 | A1 | 5/2020 | Kang |
| 2022/0085584 | A1* | 3/2022 | Reichert ............... F16G 13/16 |

FOREIGN PATENT DOCUMENTS

| | | |
|---|---|---|
| CN | 102918731 A | 2/2013 |
| CN | 107532684 A | 1/2018 |
| CN | 111326285 A | 6/2020 |
| CN | 111326996 A | 6/2020 |
| DE | 102013110399 A1 | 4/2014 |
| EP | 3913759 A2 | 11/2021 |
| JP | 2001-221292 A | 8/2001 |
| JP | 2003-106381 A | 4/2003 |
| JP | 2004-140963 A | 5/2004 |
| JP | 2006-507788 A | 3/2006 |
| JP | 2007-135299 A | 5/2007 |
| JP | 2008-199869 A | 8/2008 |
| JP | 4157096 B2 | 9/2008 |
| JP | 2008-248999 A | 10/2008 |
| JP | 2008-286257 A | 11/2008 |
| JP | 2009-259658 A | 11/2009 |
| JP | 2009-259659 A | 11/2009 |
| JP | 2011-112157 A | 6/2011 |
| JP | 2011-112224 A | 6/2011 |
| JP | 2011-214704 A | 10/2011 |
| JP | 2012-217328 A | 11/2012 |
| JP | 2013-042600 A | 2/2013 |
| JP | 2013-243811 A | 12/2013 |
| JP | 2016-201928 A | 12/2016 |
| JP | 2017-022823 A | 1/2017 |
| JP | 2017-206051 A | 11/2017 |
| JP | 2018-157713 A | 10/2018 |
| WO | WO 2017/204467 A1 | 11/2017 |
| WO | WO 2017/222196 A1 | 12/2017 |
| WO | WO 2018/212517 A1 | 11/2018 |
| WO | WO 2020/149845 A1 | 7/2020 |

OTHER PUBLICATIONS

Feb. 26, 2019, International Search Opinion issued for related PCT application No. PCT/JP2019/001566.

May 6, 2020, English-language translation of the International Search Opinion issued for related PCT Application No. PCT/JP2019/001566.

Jun. 1, 2021, Chinese Office Action issued for related CN application No. 201980008913.9.

* cited by examiner (a)

(b)

(c)

SUPPORTING MEMBER, CONDUIT SUPPORTING DEVICE, AND PROCESSING APPARATUS PROVIDED THEREWITH

CROSS REFERENCE TO PRIOR APPLICATION

This application is a continuation of U.S. patent application Ser. No. 16/962,969 (filed on Jul. 17, 2020), which is a National Stage Patent Application of PCT International Patent Application No. PCT/JP2019/001566 (filed on Jan. 18, 2019) under 35 U.S.C. § 371, which claims priority to Japanese Patent Application Nos. 2018-007699 (filed on Jan. 19, 2018) and 2018-196305 (filed on Oct. 18, 2018), which are all hereby incorporated by reference in their entirety.

TECHNICAL FIELD

The present invention relates to a conduit supporting device that is integrated with a conduit and supports the conduit, for example, a supporting member and a conduit supporting device that support a conduit used in a robot traveling device incorporated into various processing apparatuses such as a machining line, a semiconductor manufacturing apparatus, a manufacturing apparatus for a display equipment such as a flat panel display or an electronic component mounting apparatus, and a processing apparatus including the same.

BACKGROUND ART

A robot traveling device for gripping and conveying workpieces such as a processing material, a wafer and a substrate is incorporated into various processing apparatuses such as a machining line, a semiconductor manufacturing apparatus, a manufacturing apparatus for a display apparatus, and an electronic component mounting apparatus. In the robot traveling device, for example, a robot that handles a workpiece is mounted on a traveling bogie that reciprocates on a track. By operating a hand of an arm of the robot, the workpiece can be gripped in the hand, and the workpiece can be attached to and detached from each processing machine.

A cable for transmitting electric energy and a signal such as an electric or light signal, or a tube for transporting gas or liquid or transmitting pressure via gas or liquid (hereinafter, referred to as a "conduit" to encompass these cables and tubes) is connected to the traveling bogie of such a robot traveling device. It is necessary to maintain stable connection of the conduit with respect to the traveling bogie that reciprocates repeatedly so that a position thereof is changed. Thus, a conduit supporting device is utilized that maintains stable connection of the conduit by bending a conduit of a certain length in a U shape including two linear portions facing each other and a curved portion connecting the linear portions and supporting the conduit, and changing a length of the facing linear portions depending on the position of the traveling bogie. Such a supporting device can keep a radius of curvature of the conduit at a certain value or more even in a course of changing the position of the traveling bogie. As a result, it is possible to secure transmission characteristics and transportability by the conduit and to prevent the conduit from being damaged.

A conduit supporting device that is flexible into such a U shape is described in Patent Document 1. The conduit supporting device described in Patent Document 1 includes a supporting member containing a flexible material and a non-interlocking solid attached to the flexible material. The flexible material is made from, for example, stainless steel or spring steel, and the non-interlocking solid is made from, for example, a metal material or a resin material having a high resistance to compression. The supporting member has a configuration in which bending in a certain direction is limited by the non-interlocking solids being in contact with each other, and in contrast, curving in an opposite direction can be made by the non-interlocking solids being separated from each other. This makes it possible to provide a supporting member that has high flexibility, a low mechanical noise, a small bend radius, a long life, and substantially no generation of a particulate.

PRIOR ART DOCUMENT

Patent Document

Patent Document 1: Japanese Patent No. 4157096

SUMMARY OF INVENTION

Problem to be Solved by the Invention

However, the inventors of the present invention have found that the flexible material may be damaged by use for a certain period or longer or by a reciprocating motion of a certain number of times or more in a conduit supporting member described in Patent Document 1. If the flexible material is damaged during use, a function as the supporting member is lost, and not only that processing in operation is not performed appropriately, but also that the conduit is damaged and quality of an object being processed is impaired, which may lead to contamination of a surrounding atmosphere due to raising dust or the like.

The present invention has been made in view of the above problems, and an object thereof is to provide a conduit supporting member, a conduit supporting device and a processing apparatus which are excellent in reliability.

Means for Solving the Problem

To solve the problem, a supporting member of the invention described in a claim of the present application comprises: an elastic member having a first surface and extending in a first direction; and a plurality of block members fixed to the elastic member and each having a bottom surface facing the first surface of the elastic member and an end surface intersecting with the first direction, wherein the supporting member is deformable, from a first shape in which the end surfaces of the plurality of block members are in contact with each other, into a second shape in which the end surfaces of the plurality of block members are separated from each other and the supporting member is curved in a direction so that the first surface of the elastic member is at an outer side, the elastic member includes a first region whose deformation is restricted by being fixed to the bottom surface of the block member, and the supporting member includes a flexure reduction unit for reducing occurrence of flexure at a position near the first region of the elastic member.

Further, a supporting member of the invention described in a claim of the present application comprises: an elastic member having a first surface and extending in a first direction; and a plurality of block members fixed to the elastic member and each having a bottom surface facing the first surface of the elastic member and an end surface intersecting with the first direction, wherein the supporting member is deformable, from a first shape in which the end surfaces of the plurality of block members are in contact with each other, into a second shape in which the end surfaces of the plurality of block members are separated from each other and the supporting member is curved in a direction so that the first surface of the elastic member is at an outer side, and the elastic member includes: a first region whose deformation is restricted by being fixed to the bottom surface of the block member; and a second region that is in contact with the bottom surface of the block member in the first shape and is separated from the bottom surface of the block member in the second shape.

Further, it may be characterized in that a percentage of a total length of the first region of the elastic member to an entire length of the elastic member is 75% or less.

Further, it may be characterized in that the elastic member further includes a third region that is separated from the bottom surface of the block member in the first shape and is separated from the bottom surface of the block member in the second shape, and a percentage of the second region to a total length of the second region and the third region is 10% or more.

Further, it may be characterized in that the elastic member is a plate-shaped member containing SUS301 or SUS304 and having a thickness of 0.1 mm or more.

Further, it may be characterized in that the block member is made from a polymer material having a compressive elastic modulus of 1000 MPa or more in a state in which no filler is contained.

Further, a supporting member of the invention described in a claim of the present application comprises: an elastic member having a restoring force, having a first surface, and extending in a first direction; and a plurality of block members fixed to the elastic member and each having a bottom surface facing the first surface of the elastic member and an end surface intersecting with the first direction, wherein the supporting member is deformable, from a first shape in which the end surfaces of the plurality of block members are in contact with each other, into a second shape in which the end surfaces of the plurality of block members are separated from each other and the supporting member is curved in a direction so that the first surface of the elastic member is at an outer side, the elastic member includes a plurality of fixed regions whose deformation is restricted by being fixed to the bottom surface of the block member and a plurality of deformable regions that are curvable in the second shape, a percentage of a total length of the plurality of fixed regions to an entire length of the elastic member is 75% or less, and the supporting member includes a minimum curvature radius prescribing portion that prescribes a minimum radius of curvature of the supporting member.

Further, it may be characterized in that the plurality of block members include a first block member and a second block member adjacent to the first block member, and the minimum curvature radius prescribing portion includes: a first abutment surface formed in the first block member; and a second abutment surface formed in the second block member and in contact with the first abutment surface when a distance between the first block member and the second block member has reached a predetermined size by curvature of the supporting member.

Thus, a conduit supporting member, a conduit supporting device and a processing apparatus, which are excellent in durability, are provided.

EMBODIMENTS FOR CARRYING OUT THE INVENTION

Hereinafter, embodiments of a conduit supporting member and a conduit supporting device according to the inventions described in the claims of the present application will be described. It should be noted that the embodiments described below do not limit the inventions according to the claims, and all combinations of features described in the embodiments are not necessarily essential to the means for resolution of the invention. In addition, the respective embodiments of respective examples may be freely combined without losing technical meaning of the present invention.

The supporting member of the inventions described in the claims of the present application includes an elastic member, and a plurality of block members that are arranged and fixed to an upper surface of the elastic member and have end surfaces. The block members of the supporting member form a linear shape (first shape) of the supporting member by each of the end surface being in contact with an end surface of the other adjacent block member. The block members of the supporting member form a curved shape (second shape) of the supporting member by each of the end surfaces being separated from an end surface of the other adjacent block member. The elastic member includes a fixed region (first region) fixed to a bottom surface of the block member and restricted from being deformed. The supporting member includes a flexure reduction unit for reducing occurrence of flexure in the vicinity of the fixed region of the elastic member. With such a configuration, a conduit supporting member, a conduit supporting device and a processing apparatus, which are excellent in reliability, are provided.

Figure 1:
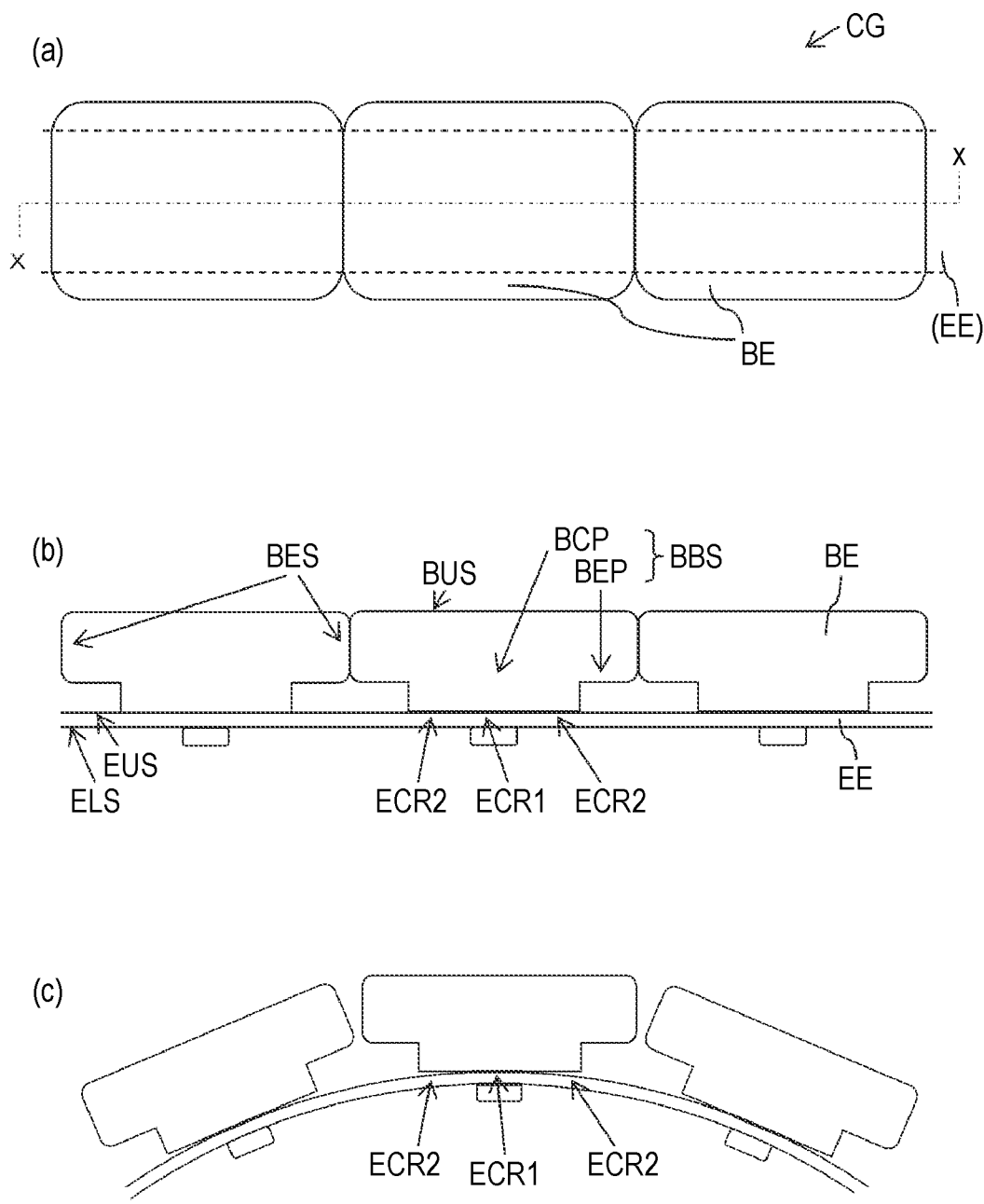
FIG. 1 is a view conceptually showing a first example of a supporting member of the present invention.

A supporting member CG includes an elastic member EE and a plurality of block members BE arranged on an upper surface of the elastic member EE. FIG. 1 is a view conceptually showing a supporting member of a first example of the present invention, in which (a) is a top view of the supporting member, and (b) and (c) are sectional views of the supporting member at an X-X position in (a). In (a), the elastic member EE is in a state of actually being blocked by the block member BE and not seen, but a width of the elastic member EE is represented by two broken lines for explanation. (b) is a view representing a time when the supporting member CG is in a linear shape, and (c) is a view representing a time when the supporting member is in a curved shape. Details will be described later, but in the conduit supporting device, a conduit is formed along the supporting member, and a shape of the conduit in the conduit supporting device is restricted by the shape of the supporting member.

The elastic member EE is a belt-shaped long member having flexibility. The elastic member EE extends in a horizontal direction (first direction) in FIG. 1 and is curvable in a plate thickness direction thereof. Thus, the elastic member EE and the supporting member CG can have shapes of both the linear portion and the curved portion in a shape of a letter U in the alphabet. The elastic member EE has not only flexibility but also a bending elastic modulus of a size capable of supporting weight of the elastic member EE, the block member and the conduit. Even when force due to the weight is applied to the elastic member EE, this makes it possible to maintain a radius of curvature R of a position corresponding to the curved portion of a letter U at a certain value or more and to prevent the conduit from being bent or cracked.

The flexibility and the bending elastic modulus of the elastic member EE may be adjusted by the type of a material to be applied, a thickness and a sectional shape of the member to be applied, and the like. For example, it is preferable that the elastic member has such a flexibility that breakage does not occur even if the elastic member is stretched and deformed 10,000 times between the curved shape having a radius of curvature of 100 mm and the linear shape. Further, it is preferable that the elastic member has such a bending elastic modulus that a deflection amount due to its own weight is 50 mm or less, preferably 30 mm or less in a cantilever structure having a length of 100 mm. It is particularly preferable that the supporting member CG has such a bending elastic modulus that a deflection amount due to its own weight is 50 mm or less in a cantilever structure having a length of 100 mm when the elastic member EE is placed under a plurality of block members BE.

The elastic member EE may be plastically deformed at a radius of curvature of 30 mm or less. In view of durability of the elastic member and the supporting member, an elastic deformation region is preferably wide. However, since the conduit has a radius of curvature of a certain value or less, characteristics thereof may change irreversibly. When a change accompanied by an irreversible characteristic change of the conduit occurs during use of the conduit supporting device CU, the characteristic change of the conduit can be found at an early stage, and a treatment such as repair or replacement of the conduit supporting device CU can be promoted by using the elastic member EE that causes plastic deformation.

Alternatively, the elastic member EE may be plastically deformed at a radius of curvature of 15 mm or less and may cause breakage at a radius of curvature of 5 mm or less.

As a material of the elastic member EE, a polymer material or a metal material can be applied. For example, a resin such as polyamide may be used, or an alloy containing iron such as stainless steel and carbon steel and a copper alloy such as phosphor bronze and beryllium copper may be used. By applying a material generally used as a leaf spring, plastic deformation due to bending can be reduced. As an example, a plate-shaped member made from SUS301 or SUS304 and having a thickness of 0.1 mm or more and 0.4 mm or less can be applied as the elastic member EE.

The elastic member EE may be made from a conductive material such as a polymer material in which metal or conductive powder is dispersed. For example, by grounding at least one end of the conductive elastic member, charging of the supporting member and an electrical influence onto the conduit thereby can be reduced.

The elastic member has a property as a spring. That is, the elastic member has a restoring force and is deformed by an external force but returns to the original shape when the external force disappears. The larger the external force is, the larger a deformation amount is, and the larger the deformation amount is, the larger a restoring force generated is. The elastic member having such property does not require a structure such as a shaft and a bearing and may be a configuration of the supporting member that can change a shape with a simple configuration. In addition, since the curved shape of the supporting member can be formed only in a region having a relatively large bend R not including a region having an extremely small bend R, a physical stress applied to the conduit or the like during curving can be reduced.

The block member BE contains a material having a large compressive elastic modulus and is a solid firmly fixed to the upper surface of the elastic member EE. As the material of the block member BE, for example, a polymer material such as a liquid crystal polymer (LCP), polyacetal (POM), polyether ether ketone (PEEK), and polybutylene terephthalate (PBT) can be used. The compressive elastic modulus can be increased by mixing a glass filler with the polymer material. In addition, low friction may be obtained by mixing polytetrafluoroethylene (PTFE). Alternatively, a metal material such as aluminum, iron, or an alloy containing them, a wooden material, and the like can also be used.

The polymer material is preferably a material having a compressive elastic modulus of 1000 MPa or more, particularly preferably a material having a compressive elastic modulus of 4000 MPa or more, in a state of containing no filler. The polymer material is preferably a material having a compressive elastic modulus of 6000 MPa or more, more preferably a material having a compressive elastic modulus of 20,000 MPa or more, in a state of containing a filler. The block member BE not only has a large compressive elastic modulus, but a light weight is suitable, particularly, a cured product of an injection molded polymer material, a product obtained by welding a metal plate or a material obtained by bend processing the metal plate, or a combination thereof is suitable. In this example, a cured product of glass reinforced polyamide obtained by injection molding is applied to the block member.

In this example, each of the plurality of block members BE has the same shape and the same size. The plurality of block members are arranged on a straight line and mounted on the elastic member EE. The respective block members are mounted on the elastic member EE in the same direction and are mounted at the same interval.

The supporting member CG in a linear shape will be described with reference to (a) and (b) in FIG. 1. The plurality of block members BE are arranged along a longitudinal direction (first direction) of the elastic member EE on an upper surface EUS of the elastic member EE. Although only three block members are shown in FIG. 1, the number of block members may be a number at which at least the supporting member CG can form a U shape including a linear portion and a curved portion, and may be determined as appropriate from tens to more than thousands depending on the required length of the supporting member (determined by a movement distance required by the conduit supporting device).

Each block member BE has an end surface BES including one end and the other end, a bottom surface BBS facing an upper surface EUS of the elastic member EE, and an upper surface BUS which is a surface opposite to the bottom surface. The bottom surface BBS includes a contact portion BCP in contact with the upper surface EUS of the elastic member EE and an escape portion BEP separated a predetermined distance from the upper surface EUS. On the other hand, the upper surface EUS of the elastic member EE includes a contact region ECR which is a region in contact with the contact portion BCP.

When in a linear shape, the end surfaces BES of the plurality of block members BE are in contact with the end surfaces BES of the other adjacent block members BE. As a result, the supporting member CG is restricted from curving in a direction in which the block member BE is on an inner side (hereinafter, curvature in a direction protruded downward is referred to as a valley warp and curvature in a direction protruded upward is referred to as a mountain warp when the block member is present on the elastic member as described above). That is, even when a stress (for example, gravity due to weight of the supporting member or the conduit) in the direction in which the valley warp is generated acts, the supporting member CG and the supporting device including the supporting member CG can maintain a linear shape.

In this regard, the linear shape may not necessarily be along a perfect straight line, and may have, for example, slight curvature (for example, a radius of curvature is 800 mm or more, preferably 1000 mm or more) in a direction of the mountain warp in a state of including no elastic deformation due to its own weight.

Further, the end surface BES may not necessarily be a surface positioned farthest from a central position of the block member. For example, the block member may include a protruding shape region extending outward from the end surface of the block member.

By the end surfaces of the respective block members BE being separated from each other, it is possible to form a mountain warp within an elastic deformation range of the elastic member EE (see (c) of FIG. 1). At this time, a fixed region ECR1 that maintains contact with the contact portion BCP of the block member and a semi-fixed region ECR2 separated from the contact portion BCP of the block member are formed in the contact area ECR of the elastic member EE. In other viewpoints, curvature in a certain direction is restricted by contact with the bottom surface of the block member, but the semi-fixed region ECR2 of the elastic member EE is configured to be curvable in a direction opposite to the certain direction.

Figure 24:
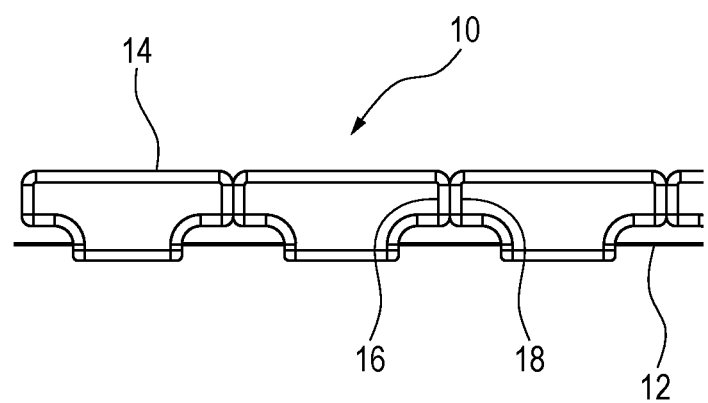
FIG. 24 is a view showing a conventional supporting member.

With such a configuration, the supporting member CG in this example is reduced from flexing, and high durability can be provided. A reason why the durability is improved will be described using the conventional art. FIG. 24 is a supporting member 10 shown in FIG. 2 of Patent Document 1, and a plurality of non-interlocking solids 14 are mounted on the flexible material 12. In the supporting member 10, the flexible material 12 includes a region (hereinafter, referred to as a "deformation restricted region") in which the non-interlocking solid 14 is mounted so that deformation is restricted, and a freely deformable region (hereinafter, referred to as a "free deformation region") without mounting the non-interlocking solid. In such a configuration, when the supporting member 10 is curved in a direction of the mountain warp, the curved shape is formed by only the free deformation region having only a limited length. Therefore, in the flexible material 12, a sharp bend occurs locally in a free deformation region, particularly in an end portion of the free deformation region.

Hereinafter, for the sake of distinction, a macroscopic bend formed by the elastic member over a length including a certain number (for example, 10) or more of non-interlocking solids (block members) is referred to as curvature, and a microscopic bend of the elastic member locally occurring at a position other than the mounting portion of the non-interlocking solid, etc, is referred to as flexure. A radius of curvature of the flexure is smaller than a radius of curvature of the curvature, that is, there is a sharp bend shape, and occurrence of flexure breaks the elastic member or accelerates fatigue or deterioration of the elastic member. In particular, in a case where the elastic member has a predetermined bending elastic modulus as described above, or in a case where the elastic member has a restoring force, when flexure having a locally small radius of curvature occurs, reliability of the elastic member may be greatly affected.

The inventors of the present invention who have found the problem first consider to reducing occurrence of flexure by reducing the deformation restricted region and increasing the free deformation region. In addition, it was studied to generate a bend of the flexible material even in a region where the non-interlocking solid is mounted, for example, by forming an elastomer having an elastic modulus smaller than that of the non-interlocking solid between the flexible material and the non-interlocking solid. However, as a result of experiments and studies, it has been found that a new problem may arise in these methods.

When the conduit supporting device is used in the processing apparatus, a large force in a direction parallel to a direction in which the flexible material extends may be applied to the non-interlocking solid of the supporting member. For example, the non-interlocking solid at a position which is an end part of the linear shape portion in the U shape of the supporting member and is adjacent to the curved shape portion is, at its one end at the linear shape portion side, in contact with other adjacent non-interlocking solid so that a pressure is applied from the other adjacent non-interlocking solid, hut, on the other hand, is not in contact with another adjacent non-interlocking solid at its other end at the curved shape portion side. Therefore, a large stress in a direction from the linear shape portion side toward the curved shape portion side may be applied to the non-interlocking solid. Alternatively, when the conduit supporting device is deformed at high speed, momentary distortion in the shape of the supporting device may add stress in a direction in which the flexible material extends to a particular non-interlocking solid.

At this time, in the supporting member in which the deformation restricted region is reduced as described above or the supporting member in which the elastomer is formed between the flexible material and the non-interlocking solid, the non-interlocking member is easily and largely inclined. The non-interlocking solid largely inclined may cause flexure on the flexible material at an adjacent position near the mounting portion. In addition, the non-interlocking solid may ride on or slip under the other adjacent non-interlocking solid. In such a case, the flexible material may be flexed at the adjacent position near the mounting portion of the non-interlocking solid.

In contrast, in the supporting member of the present invention, the elastic member includes the semi-fixed region ECR2. This region does not restrict the curvature in a direction of the mountain warp of the elastic member EE. Therefore, it is possible to obtain the same effect as in a case where the fixed region is reduced with respect to the curvature in the direction of the mountain warp. Even when the fixed region is reduced, the semi-fixed region ECR2 can reduce inclination of the block member BE with respect to the elastic member EE. As a result, the supporting member where occurrence of flexure is reduced and durability is greatly improved is provided.

In addition, in the linear shape, since a contact area between the block member BE and the elastic member EE can be increased, a proof stress against the curvature in a direction of the valley warp can also be increased. This makes application to a processing apparatus having a large moving distance possible.

In this example, the fixed region ECR1 is formed at a position between the two semi-fixed regions ECR2. The fixed region ECR1 and the two semi-fixed regions ECR2 are formed at positions between two escape portions BEP without contact between the block member and the elastic member at a timing including a time when the supporting member CG is in a linear shape. In this way, by reducing the restriction of deformation of the elastic member stepwise from the fixed region, it is possible to obtain a supporting member which is capable of being smoothly operated and has excellent durability. Further, the structure is symmetrical with respect to the fixed region. By adopting such structure, even during a high speed operation, vibration is reduced, and a stable operation can be obtained. However, arrangement is not necessarily limited thereto, and for example, a semi-fixed region of a certain block member may be adjacent to a semi-fixed region of an adjacent block member without providing the escape portion BEP. Alternatively, in an upper surface EUS of the elastic member EE, a fixed region may be formed on one side, and a semi-fixed region may be formed on the other side of a region facing the contact portion BCP of the block member.

It is sufficient for the elastic member in the fixed region that its relative position and shape are fixed to the bottom surface of the block member with which the fixed region is in contact. For example, in the fixed region, the elastic member does not need to have a precise linear shape, and when the elastic member is fixed in a curved shape, it is sufficient if that the curved shape is maintained.

In a longitudinal direction of the elastic member, a percentage of a total length of the plurality of fixed regions to an entire length of the elastic member is preferably 75% or less, more preferably 50% or less, and particularly preferably 45% or less. Such a supporting member can secure a region (the semi-fixed region and/or region facing the escape portion) where deformation of the elastic member is possible over a certain length or more during curving. On the other hand, when the fixed region is extremely reduced, it becomes difficult to secure mounting strength of the block member and an inclination prevention characteristic of the block member, and therefore the percentage of the length of the fixed region to the entire length of the elastic member is preferably 15% or more.

A percentage of the semi-fixed region of a region other than the fixed region of elastic member, namely of a region that can be deformed when the supporting member is curved, may be 10% or more, preferably 30% or more, and particularly preferably 70% or more.

When the above percentage is calculated, the entire length of the elastic member does not necessarily need to be an entire length from one end to the other end of the elastic member included in the supporting member, and a length sufficient to the entire length of the block member of, for example, 1 m may be taken out and regarded as the entire length of the elastic member. In particular, in the supporting member, when the block member is formed of repetition of the same shape, the length may be regarded as the entire length of the elastic member by taking out a length of an integral multiple of a length of the repetition pattern.

At least a deformable region of the elastic member has uniform bending elasticity in the longitudinal direction of the elastic member. Such a configuration is provided, for example, by a leaf spring having the same width and thickness over the longitudinal direction.

Figure 2:
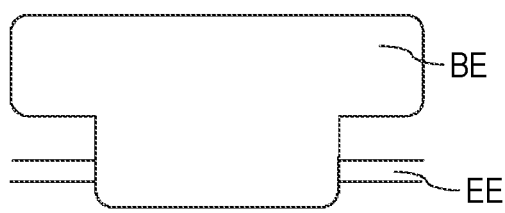
FIG. 2 is a view conceptually explaining a mounting portion of a block member of the supporting member of the present invention.
Figure 2:
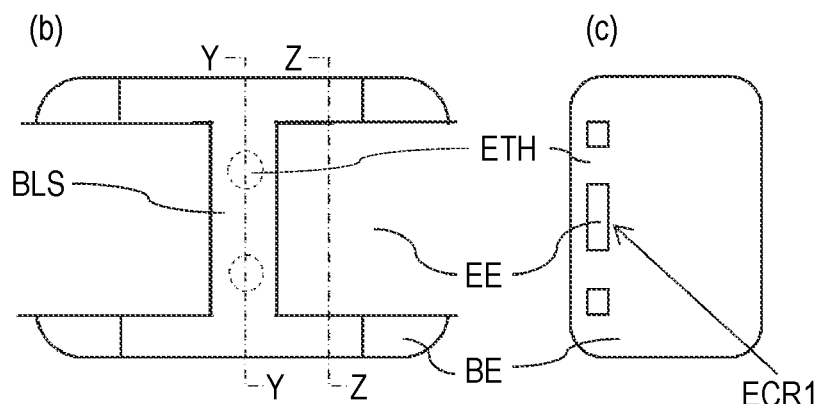
Figure 2:
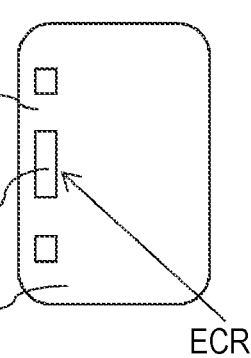
Figure 2:
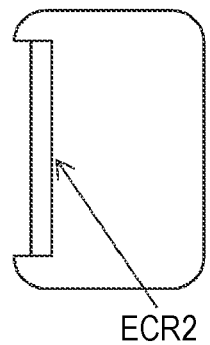

FIG. 2 is a view conceptually showing a mounting portion of the supporting member according to the first example of the present invention. (a) is a side view, (b) is a view seen from a lower surface side of the elastic member EE, (c) is a sectional view at a position of Y-Y in (b), and (d) is a sectional view at a position of Z-Z in (b).

In this example, the block member BE includes a lower surface side supporting portion BLS formed on the lower surface side of the elastic member EE. The lower surface side supporting portion has a function of mounting the block member on the elastic member by sandwiching the elastic member EE together with the contact portion CP of the bottom surface BBS of the block member. Positions of the lower surface side supporting portion BLS and a body portion of the block member are fixed to each other via a connection unit. The lower surface side supporting portion BLS may be integrally made from the same material as the block member BE or may be made from a material different from the block member BE. The connection unit between the lower surface side supporting portion BLS and the block member BE may be formed in a region outside the elastic member EE and/or may be formed through a through hole provided in the elastic member EE. The connection unit may be integrally made from the same material as the block member BE and/or the lower surface side supporting portion BLS or may be made from other material such as a screw or a rivet.

The area and shape of the lower surface side supporting portion are important. In the region where the lower surface side supporting portion is formed, the curvature of the elastic member is restricted except, for example, a case of a form to be described later. Therefore, in order to form the semi-fixed region, it is necessary that, as viewed from the bottom surface, a size of the lower surface side supporting portion is sufficiently small compared with a size of the contact portion BCP on the upper surface side of the elastic member with the block member BE, and the semi-fixed region can be formed at an appropriate position.

Further, as shown in (b) of FIG. 2, by arranging a plurality of connection units in a direction perpendicular to the longitudinal direction (first direction) of the elastic member EE, it is possible to achieve both the size of the semi-fixed region and magnitude of connection strength. The number of the connection units is not limited to two as shown in the drawing, but may be three or more, and may be arranged in two stages or in a zigzag manner. A shape in a plan view is not limited to a circular shape and may be an ellipse or a rectangle having a longitudinal direction in a direction perpendicular to the first direction. Alternatively, a plurality of ellipses or rectangles having a longitudinal direction in a direction parallel to the first direction may be arranged in a direction perpendicular to the first direction.

When a through hole is formed in the elastic member as described above, a width of the elastic member in a region close to the formation regions (a distance between two sides of the elastic member parallel to the longitudinal direction of the elastic member) may be larger than a width of the elastic member in the other region (not shown in the drawings). Alternatively, the width of the elastic member at a contour position of the lower surface side supporting portion may be larger than the width of the elastic member in the other region (not shown in the drawings). As a result, it is possible to reduce a partial decrease in strength due to formation of the through hole and deterioration of the elastic member due to concentration of a stress.

In this example, the block member BE is mounted on the elastic member by injection molding of a resin material. The resin constituting the block member BE is formed so as to wrap around a side surface and a lower surface ELS of the elastic member EE, and surrounds the elastic member EE from four directions over a certain length as shown in (c) of FIG. 2. In the portion of the elastic member including the fixed region ECR1, deformation in both the mountain warp direction and the valley warp direction is restricted by the resin. The elastic member EE is further adjacent to both sides of the portion and has a resin formed on the upper surface and the side surface but has a region at the lower surface in which a resin is not formed. This recon includes the semi-fixed region ECR2, and the curvature in the valley warp direction is restricted by the resin on the upper surface side, but the curvature in the mountain warp direction is not restricted by any resin.

The elastic member EE may have a recessed portion or a through hole in the fixed region ECR1, and mounting strength to a stress in a direction parallel to the first direction can be improved by injection molding so that this part is filled with the resin.

Further, the side surface supporting portion in contact with the side surface of the elastic member EE may not be necessarily formed. However, the side surface supporting portion at a position adjacent to the fixed region ECR1 makes the mounting firm, the side surface supporting portion at a position adjacent to the semi-fixed region ECR2 has an effect of maintaining a shape during curving, and therefore, it is suitable to include either one or both of these side surface supporting portions.

Figure 3:
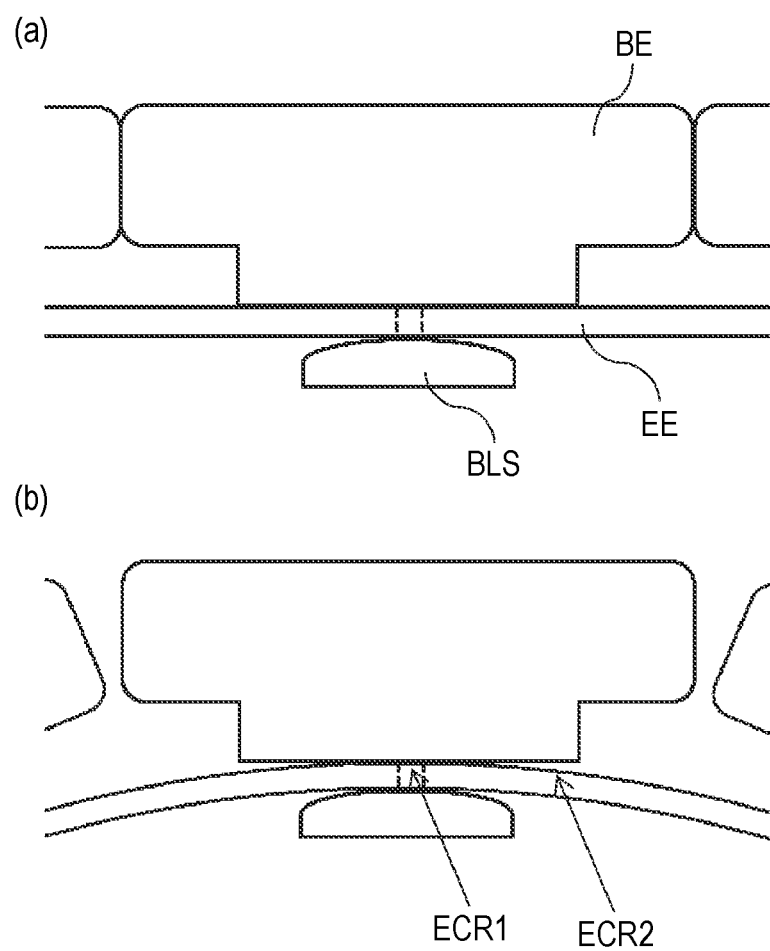
FIG. 3 is a view conceptually showing a second example of the supporting member of the present invention.

FIG. 3 is a view conceptually showing a second example of the supporting member of the present invention. (a) of FIG. 3 represents a cross-section of the supporting member in a linear shape, and (b) of FIG. 3 represents a cross-section of the supporting member in a curved shape. Although a connection unit between the block member BE and the lower surface side supporting portion BLS is represented by a broken line, the connection unit is not necessarily required to be positioned at this cross-section (the same is applied also to FIG. 4 and later drawings unless otherwise specified). In this example, at least a part of the upper surface of the lower surface side supporting portion BLS formed on the lower surface side of the elastic member EE is formed of a curved surface, which is different from those in other examples. In this way, the semi-fixed region ECR2 can be formed larger. Further, by adjusting the position and shape of the upper surface of the lower surface side supporting portion BLS, a minimum radius of curvature of the curvature of the elastic member EE in the bottom surface and a peripheral region thereof of each block member can be prescribed. In this way, since the lower surface side supporting portion BLS in this example functions as a unit for limiting an upper limit of a curvature amount, it is possible to reduce occurrence of flexure due to variation in microscopic curvature in the longitudinal direction of the supporting member CG. The upper surface of the lower surface side supporting portion BLS may not necessarily be a curved surface as long as a side closer to the end surface BES of the block member is lower than a side of the fixed region of the elastic member, and may have another shape such as a step shape.

Figure 4:
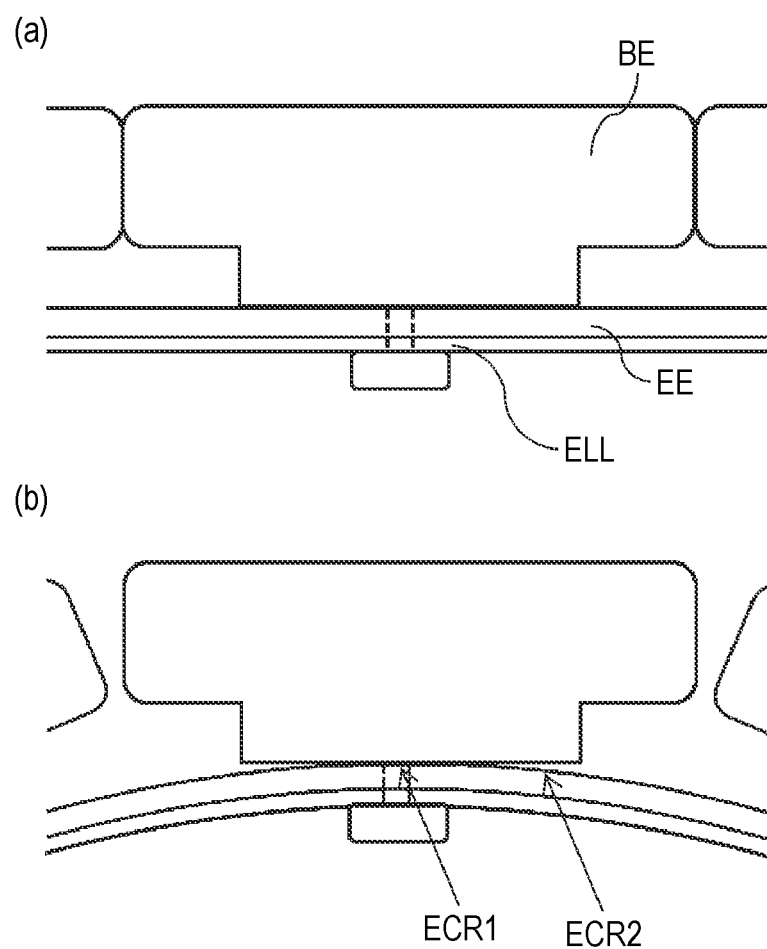
FIG. 4 is a view conceptually showing a third example of the supporting member of the present invention.

FIG. 4 is a view conceptually showing a third example of the supporting member of the present invention. (a) of FIG. 4 represents a cross-section of the supporting member in a linear shape, and (b) of FIG. 4 represents a cross-section of the supporting member in a curved shape. In this example, a low elasticity layer ELL is formed between the lower surface ELS of the elastic member and the upper surface of the lower surface side supporting portion BLS, which is different from those in other examples. The low elasticity layer ELL has an elastic modulus smaller than that of either the lower surface side supporting portion BLS or the elastic member EE. As the low elasticity layer ELL, for example, urethane resin, vinyl chloride, fluorine rubber, and the like can be applied. As a result, even when an area of the upper surface of the lower surface side supporting portion BLS is increased to a certain range, restriction of the curvature of the elastic member EE in the mountain warp direction can be reduced. The low elasticity layer ELL may be formed in at least a region corresponding to the upper surface of the lower surface side supporting portion BLS and does not need to be formed on the entire lower surface ELS of the elastic member. However, by the low elasticity layer ELL being formed by application or pasting to the entire lower surface of the elastic member before mounting of the block member, manufacturability of the supporting member can be improved.

Figure 5:
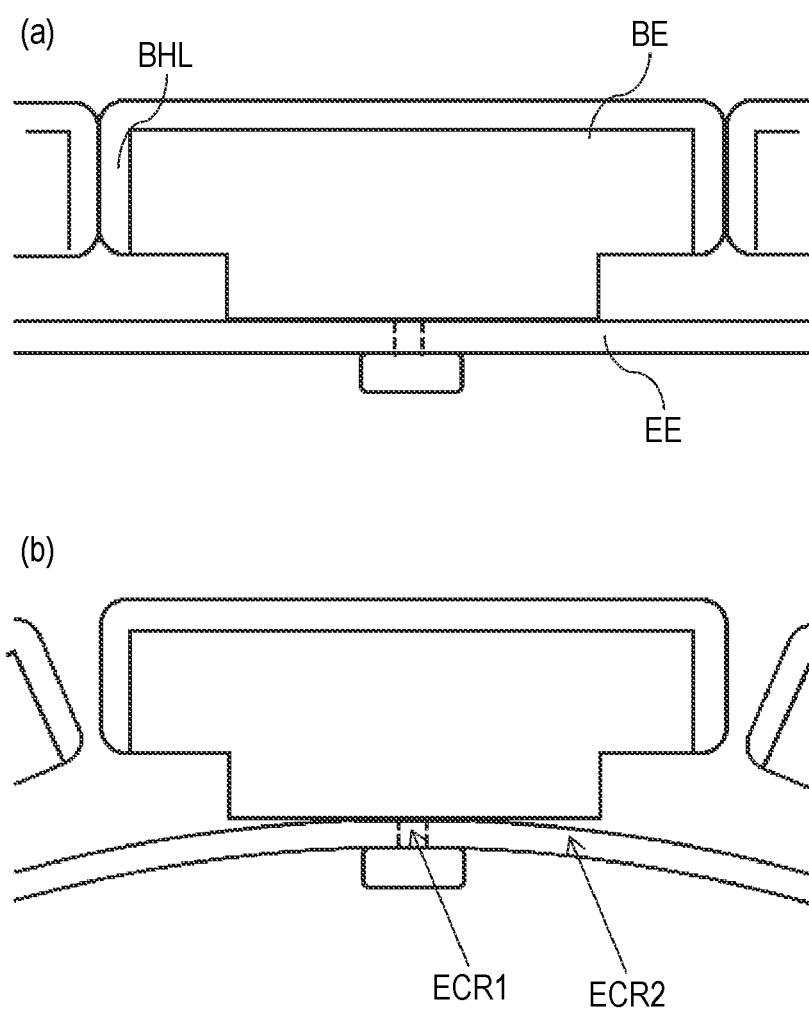
FIG. 5 is a view conceptually showing a fourth example of the supporting member of the present invention.

FIG. 5 is a view conceptually showing a fourth example of the supporting member of the present invention. (a) of FIG. 5 represents a cross-section of the supporting member in a linear shape, and (b) of FIG. 5 represents a cross-section of the supporting member in a curved shape. In this example, a high rigidity layer BHL having an elastic modulus higher than the block member body is formed on the end surface BES of the block member, which is different from those in other examples. The high rigidity layer may also be formed on a side surface (a surface parallel to the first direction), which is not shown in the drawings, of the block member. The high rigidity layer BHL is made from a high hardness material such as a polymer material such as PEEK or a metal such as carbon steel. Even when a specific gravity of the high rigidity layer is large, by being kept in partial use, the supporting member is provided in which elastic deformation and wear of the block member are reduced while a weight increase is minimized.

In this example, by bending a plate made from SUS304 or aluminum, a cap portion including a recessed portion therein is formed, and the cap portion is covered with a block member body portion made from a polymer material. In particular, when a covering member has a certain thickness in the longitudinal direction (first direction) of the elastic member EE, hoop molding can be performed in a state where the elastic member has a linear shape, and thus high productivity and reliability are provided as will be described later.

The high rigidity layer BHL is not limited to a shape covered with a polymer material, and for example, one or more columnar high rigidity layers BHL may be embedded and fixed, in a direction parallel to the first direction, in the block member body made from a polymer material. Alternatively, the high rigidity layers BHL may be fixed onto the block member body portion via an adhesive layer.

The high rigidity layer BHL is preferably exposed at both ends of the block member BE as shown in the drawing but is not limited thereto. For example, both ends of the block member BE may be made from a polymer material constituting the block member body. It is sufficient that the high rigidity layer BHL is formed so as to increase the compressive elastic modulus of the block member against a compressive stress in the direction parallel to the first direction.

Figure 6:
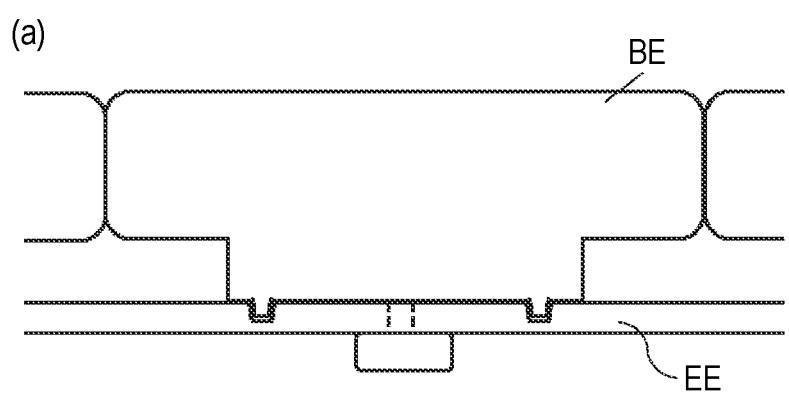
FIG. 6 is a view conceptually showing a fifth example of the supporting member of the present invention.
Figure 6:
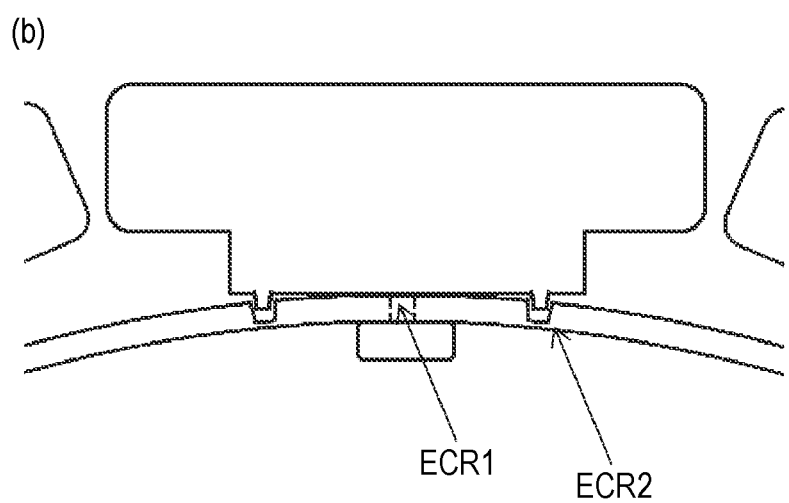

FIG. 6 is a view conceptually showing a fifth example of the supporting member of the present invention. (a) of FIG. 6 represents a cross-section of the supporting member in a linear shape, and (b) of FIG. 6 represents a cross-section of the supporting member in a curved shape. In this example, a recessed portion is formed in the semi-fixed region ECR2 of the elastic member, and a protruded portion that can be fitted in the recessed portion is formed at a position corresponding to the recessed portion on the bottom surface of the block member BE, which is different from those in other examples.

When the supporting member is in a linear shape, the protruded portion and the recessed portion can mesh with each other to increase the mounting strength of the block member against the stress in the first direction. When the elastic member EE is curved in the direction of the mountain warp, the protruded portion and the recessed portion move relatively in separate directions to not restrict the curvature. A protruded portion may be formed on a side of the semi-fixed region ECR2 of the elastic member and a recessed portion may be formed on a side of the bottom surface of the block member. The recessed portion may be a through hole.

Figure 7:
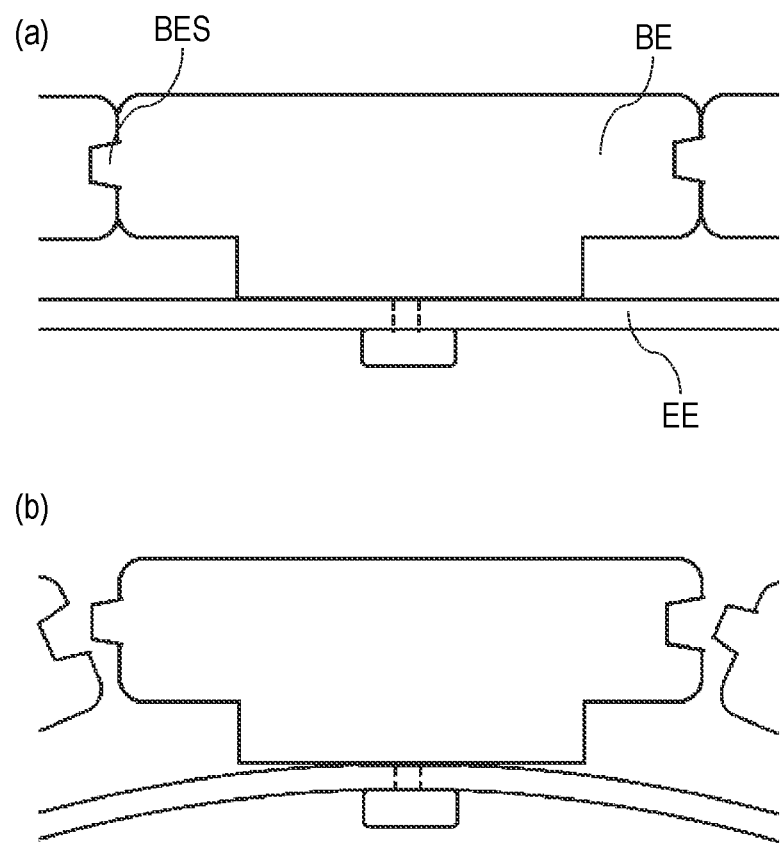
FIG. 7 is a view conceptually showing a sixth example of the supporting member of the present invention.

FIG. 7 is a view conceptually showing a sixth example of the supporting member of the present invention. (a) of FIG. 7 represents a cross-section of the supporting member in a linear shape, and (b) of FIG. 7 represents a cross-section of the supporting member in a curved shape. In this example, a protruded portion (or a recessed portion) is formed on an end surface BES of a block member, and a recessed portion (or a protruded portion) is formed on a surface that is an end surface of another block member adjacent to the block member and faces the end surface BES of the block member so as to mesh with the protruded portion (or the recessed portion). The protruded portion (or the recessed portion) preferably has a sectional shape such as a circle or a square viewed from the first direction, such as a truncated cone or a truncated pyramid, but may have a shape where the cross-section has a longitudinal direction. For example, in a sectional shape extending in a direction parallel to a width direction of the elastic member EE, and in a sectional shape that can reduce the block member from riding on or slipping under and extends in a direction perpendicular to the upper surface of the elastic member EE, rigidity of the supporting member against torsion can be effectively increased.

Figure 8:
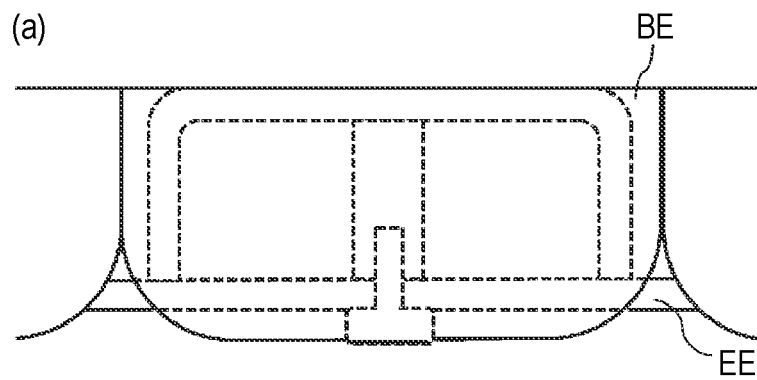
FIG. 8 is a view conceptually showing a seventh example of the supporting member of the present invention.
Figure 8:
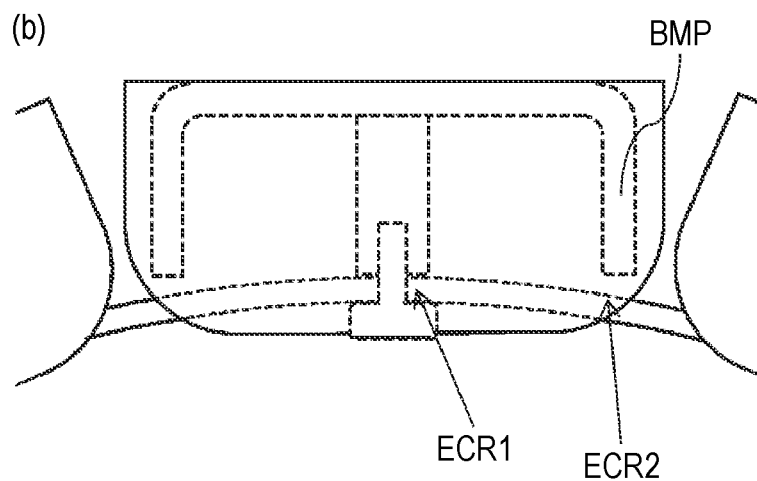
Figure 8:
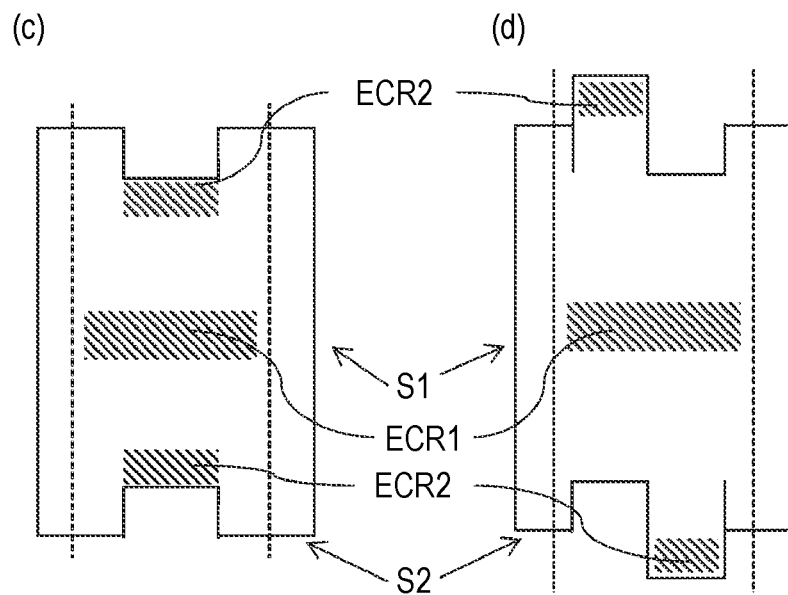

FIG. 8 is a view conceptually showing a seventh example of the supporting member of the present invention. (a) of FIG. 8 represents a cross-section of the supporting member in a linear shape, and (b) of FIG. 8 represents a cross-section of the supporting member in a curved shape. In (a) of FIG. 8 and (b) of FIG. 8, for the sake of explanation, only a view showing a sectional structure of the block member BE positioned at the center of the drawing is shown by a broken line. (c) of FIG. 8 is a top view of the block member, and (d) of FIG. 8 is a top view of the block member in a form different from that of (c) of FIG. 8. In (c) of FIG. 8 and (d) of FIG. 8, a width of the elastic member EE is indicated by a broken line for explanation, and the fixed region ECR1 and the semi-fixed region ECR2 of the elastic member EE are indicated by hatching.

In the supporting member, the block member BE is formed by bending a metal plate. The block member BE has a top plate including a rectangular upper surface BUS, and the top plate has a first side S1 parallel to a first direction of the elastic member EE and a second side S2 perpendicular to the first direction ((c) of FIG. 8 and (d) of FIG. 8). The first side is a line where a side surface BSS of the block member BE intersects with the upper surface BUS and is formed by bending a flat plate. The second side is a line where an end surface BES of the block member BE intersects with the upper surface BUS. Although the second side may be formed by bending in the same manner as the side surface, in this example, the side surface of the metal plate that is a material is used as it is. The second side S2 may partially include a recessed portion or a protruded portion, and has a post BMP that is bent downward and extends downward until contact with the elastic member EE is possible in a region adjacent to the recessed portion and a region including the protruded portion. An apical surface of the post BMP is in contact with the semi-fixed region ECR2 of the elastic member in a linear shape and is separated from the elastic member in a curved shape.

In this example, the fixed region ECR1 formed at the center of the block member is separated from the semi-fixed region ECR2 formed in the vicinity of an end portion of the block member. By increasing a distance between the fixed region and the semi-fixed region, an inclination prevention effect of the block member can be more effectively exhibited. The block member has a quadrangular configuration including three sides formed in a shape of bending the raw material metal plate and one side made from an elastic member as viewed from the first direction. Due to a shape effect of such a configuration, the block member can achieve both high compressive elasticity and lightness. The shape is not limited to a square as viewed from the first direction and may be a triangle or more. Further, the side of the elastic member EE may have a side made from a metal plate within a range that does not restrict the curvature in the direction of the mountain warp of the elastic member.

Further, as shown in (d) of FIG. 8, a part of the metal plate or the post may be protruded outside the end surface of the block member, and at least a part of the semi-fixed region ECR2 may be formed outside the end surface of the block member. At this time, the adjacent block member preferably forms a recessed portion that is retreated to the inside of the end surface of the block member at a corresponding position. By avoiding interference between the protruded region and the adjacent block member and having portions that mesh with each other, deformation in a transversal direction or a torture direction can be reduced. The protruded region may have a post extending perpendicularly downward from the upper surface BUS but is preferably a post having a shape that extends obliquely downward and penetrates into a region overlapping with the adjacent block member.

Figure 9:
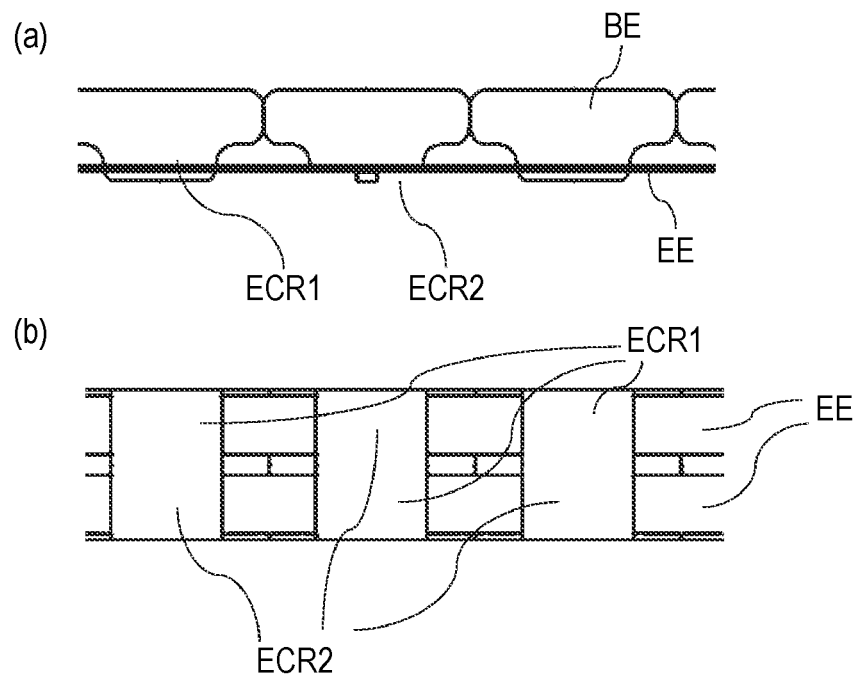
FIG. 9 is a view conceptually showing an eighth example of the supporting member of the present invention.

FIG. 9 is a view conceptually showing an eighth example of the supporting member of the present invention. As shown in the side view (a), in this example, each of the different block members includes a fixed region and a semi-fixed region. An effect of reducing flexure by the block member including the semi-fixed region also extends to a block member that does not include a nearby semi-fixed region. Therefore, the supporting member including the block member having only the fixed region and the block member including the semi-fixed region provides improved durability.

As shown in the bottom view (b), in the same block member, the fixed region and the semi-fixed region may be arranged in parallel (in a direction perpendicular to the first direction). At this time, as shown in the drawing, the elastic member EE includes two elastic members, and each of the plurality of block members BE may be mounted so as to straddle a first elastic member EE1 and a second elastic member EE2. The two elastic members are disposed adjacently on the same plane and extend in the first direction. Further, it is particularly preferable that the fixed region and the semi-fixed region are adjacent to each other in the first direction. By arranging in a zigzag as shown in the drawing, a particularly stable durability improving effect can be obtained. Further, by arranging the fixed region and the semi-fixed region with regularity, it is possible to obtain a small and averaged effect of a difference due to the position of the supporting member.

Figure 10:
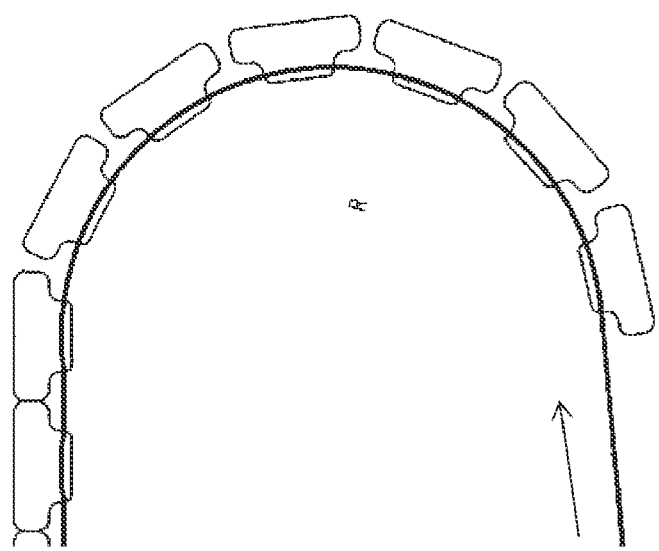
FIG. 10 is a view explaining a method of manufacturing the supporting member of the present invention.

FIG. 10 is a view explaining an example of a method of manufacturing the supporting member of the present invention. First, through holes are formed at a first pitch in the elastic member (not shown in the drawings). Next, the elastic member in which the through hole is formed is introduced into an injection mold including a plurality of cavities. In this example, the injection mold has six cavities, and each cavity is separated by a distance corresponding to the first pitch. The leaf spring is fed in a direction of an arrow from the lower right of the drawing and the elastic member is supplied into all the six cavities, then the resin that is the block member body is injected into each cavity, and the inside of the cavity is filled with the resin. At this time, the resin portion is preferably formed on a lower surface side of a partial region of the elastic member, and the resin may not be formed on a lower surface side in the other region of the elastic member (for example, the lower surface of the elastic member is brought into close contact with the mold so as not to enter the resin). The resin portion formed in the partial region can be the lower surface side supporting portion BLS. The region of the elastic member EE in contact with the lower surface side supporting portion BLS can be set as the fixed region ECR1. Further, in the elastic member EE in the cavity, the region where the resin on the upper surface side is formed and the resin on the lower surface side is not formed can be set as the semi-fixed region ECR2. In this drawing, a cavity shape having a side surface supporting portion in contact with the side surface of the elastic member EE is exhibited.

Here, in the mold, the elastic member is disposed in a state of being curved so that its upper surface is the outer periphery. This makes it possible to form a resin in a state where a distance between the block members when the plurality of block members BE is formed into a linear shape is zero. Although a plurality of block members may be collectively formed in a non-curved state and then cut to be separated into individual block members, curvature of the supporting member in the valley direction is allowed by an extent of cutting. In such a case, a spacer having a predetermined thickness may be formed on the end surface of the block member. For example, by utilizing a thickness of a high rigidity member of the fourth example as the spacer, it is possible to obtain excellent productivity in addition to improvement in reliability.

The resin is cured to a degree that is taken out of at least the mold, then the leaf spring is fed forward by the distance corresponding to the six block members, and the next six block members are formed. By repeating this, it is possible to efficiently manufacture the supporting member. The fixed region and the semi-fixed region do not necessarily need to be defined by only the lower surface side supporting portion. For example, the elastic member in the semi-fixed region may be deformed and physically peeled off while being fixed so as not to damage adhesion force of the fixed region. In addition, the fixed region and the semi-fixed region may be formed by controlling or activating/deactivating surface roughness with respect to a predetermined region of the elastic member and generating a difference in adhesion strength with an adhesion improving/lowering agent such as fat or oil. Alternatively, one or more of these may be combined.

Figure 11:
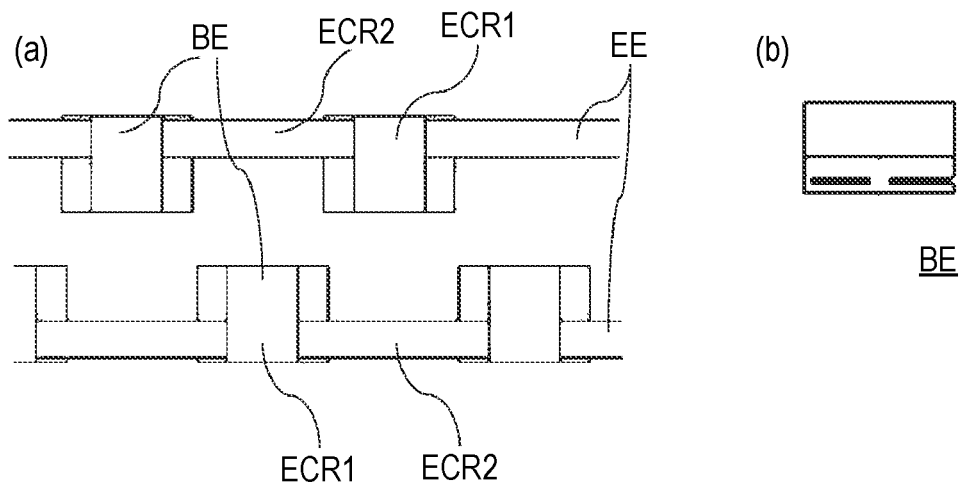
FIG. 11 is a view explaining a method of manufacturing the supporting member of the present invention.

FIG. 11 is a view explaining an example of a method of manufacturing the supporting member in the eighth example of the present invention. In this example, a mold in which a cavity during hoop formation is arranged at a pitch of twice the first pitch is prepared. The block member formed in each cavity includes a fixed region and a semi-fixed region adjacent in a direction perpendicular to the first direction of the fixed region. For example, the semi-fixed region has a slit structure in which an elastic member can be inserted from, for example, a transversal direction (perpendicular to the first direction), a wedge shorter than a first direction length of a slit may be hammered in the lower surface side of the elastic member after inserting the elastic member into the slit, and a protruded portion corresponding to the wedge may be formed in advance in the slit. A fixing method is not limited thereto, and may be any method as long as inclination of the block member is reduced even when a stress in the first direction is applied, and curvature of the elastic member corresponding to the mountain warp of the supporting member is allowed. By combining the elastic members in which the two block members obtained by the mold are formed as shown in the drawing, it is possible to easily obtain a block member in which the fixed region and the semi-fixed region as shown in (b) of FIG. 9 are arranged in a zigzag.

Figure 12:
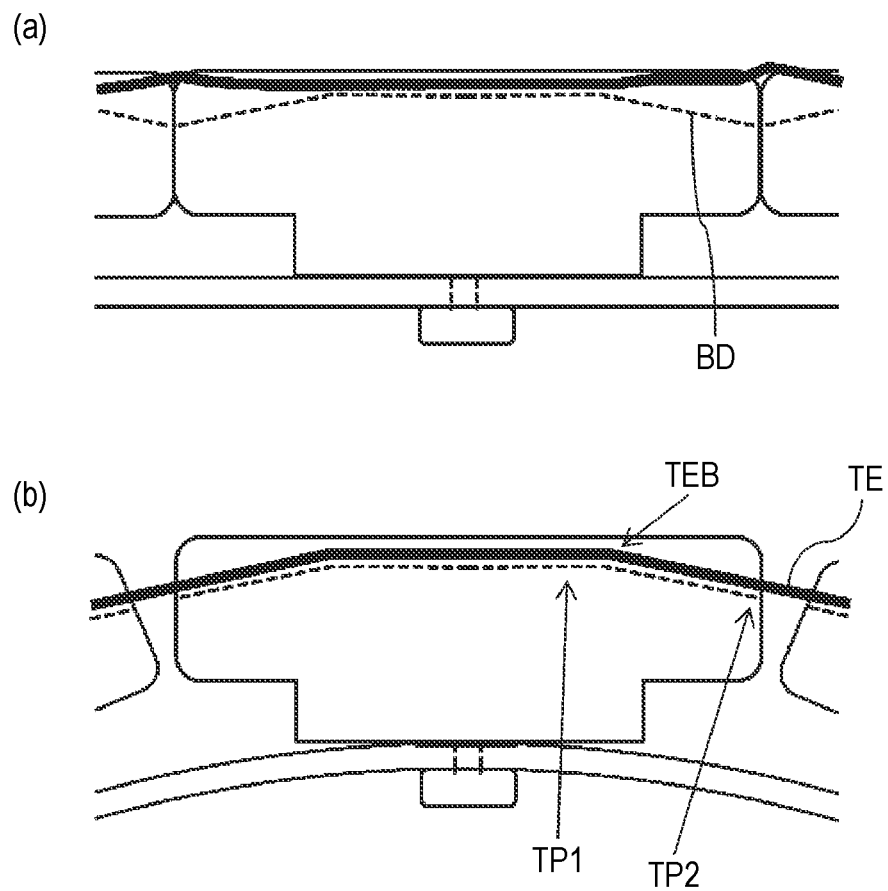
FIG. 12 is a view conceptually showing a ninth example of the supporting member of the present invention.

FIG. 12 is a view conceptually showing a ninth example of the supporting member of the present invention. In this example, the supporting member CG includes a coupling portion TE that couples the block members to each other. The coupling portion limits a radius of curvature between a block member and another block member to not be equal to or less than a certain value. In this way, a coupling portion TE acts as a curvature limit prescribing unit, thereby reducing occurrence of flexure and providing the supporting member CG having excellent durability and high reliability.

When the elastic member EE has a property as a spring, the curved shape of the supporting member is determined by a relationship between a bending elastic modulus and an external force even without such a coupling portion TE. However, an accidental or temporary external stress may be applied to a specific position of the supporting member due to a collision with another member, a catch during operation, or the like. Alternatively, durability of the specific position of the supporting member may be poor due to variations in quality and characteristics of respective members constituting the supporting member, and wear of the specific position may progress due to distribution of hardness and weight of a supported member. When local strength deterioration of the elastic member EE occurs due to such a reason, a deformation amount of the position is large even under the same external force, so that deterioration is further accelerated, and finally the elastic member EE is damaged through flexure. In contrast, in the supporting member of this example, even when a large external stress is locally applied or local strength deterioration occurs, a minimum radius of curvature of the curvature is prescribed by the coupling portion TE, and further deterioration is reduced. Since the curvature of the entire supporting member is formed by curving another position where only a radius of curvature larger than the prescribed minimum radius of curvature is generated, in addition to improvement of the durability of the supporting member, a curved shape in which a curved shape of each part is further averaged can be obtained.

When the elastic member is made from a material having a certain or higher elastic modulus or a material having a restoring force, such as a metal used for the leaf spring, since a risk of relative position displacement or the like between the block members is small, a percentage of a deformable region (the semi-fixed region and/or region facing the escaping portion) in the longitudinal direction of the elastic member can be increased. In the supporting member to which such an elastic member is applied, since the curved shape of the supporting member can be formed by deformation of a wide region of the elastic member, high reliability can be obtained. On the other hand, when a large external stress is applied accidentally or temporarily or when bending with a radius of curvature smaller than that of a normal operation has occurred due to a locally large external stress, such a material may be damaged larger than a material having a small elastic modulus.

In contrast, by combining a unit for prescribing the minimum radius of curvature with the supporting member that can form a fixed radius of curvature alone by spring elasticity or a restoring force of the elastic member, a supporting member having high reliability in both the normal operation and the accidental/temporary operation is provided.

In this example, the elastic member EE not only determines the curved shape of the supporting member but has a vibration reducing function. In the supporting member including the coupling portion, the presence or absence of the function of the coupling portion may be instantaneously switched, which may cause vibration during operation of the supporting member. In contrast, a deformation speed can be moderately reduced and vibration can be reduced before action of the coupling portion by a shape restoring force caused by curving and bending elasticity of the elastic member EE.

The coupling portion is formed between at least two block members, and is physically connected such that a block member and another block member can interlock with each other. For example, the coupling portion may be a tape of which both ends are pasted to upper surfaces of the two block members respectively. A length thereof results in a remainder when the supporting member is in a linear shape or does not generate tension. In addition, when the supporting member is in a prescribed curved shape or a curved shape between the block members is in the prescribed curved shape, any length may be used as long as the remainder is absent or tension is generated. Further, when the supporting member includes the semi-fixed region, separation between the upper surface of the elastic member EE and the lower surface of the block member BE occurs in the semi-fixed region, and then generation of vibration is preferably reduced in addition to improvement in reliability when the length is not too large.

In this example, the coupling portion may be any member having flexibility, and is suitably a string or fibrous member in addition to the tape. A material of the coupling portion is preferably a material having excellent strength, slippage, and low dusting property, and examples thereof include a fluorine resin and a polyamide resin. The material is not limited to a polymer material, and a metal wire or the like may be used. However, it is only necessary to reduce flexure of the elastic member EE by the coupling portion, and it is not necessary to determine a curved shape only by this. Therefore, excessive strength is not required, and a flexible coupling portion can be used to reduce the size and weight. For example, breaking strength of the coupling portion may be smaller than that of the elastic member EE when a tensile stress is applied in the first direction. A weight per unit length in the first direction may be smaller than the weight of the elastic member EE. Further, the coupling portion preferably has a smaller bending elastic modulus than that of the elastic member, and more preferably has a bending elastic modulus smaller than that of a conduit bag CP for storing the supporting member.

Preferably, as indicated by a broken line in the drawing, a recessed portion (groove BD) in which the bottom surface extends in the first direction is formed on the upper surface BUS of the block member BE, and the coupling portion TE is preferably formed in the recessed portion. Alternatively, a protruded portion may be provided at a position where the coupling portion TE is not formed in the upper surface BUS. By setting the coupling portion at a relatively low position, when the supporting member is in a linear shape, an amount of extension of the remainder of the coupling portion TE can be reduced, and contact with the conduit bag CP (not shown in the drawings) for storing the supporting member can be reduced. Particularly preferably, even though the supporting member has a linear shape, the coupling portion has a groove depth (or a height of the protruded portion) in which the coupling portion is not in contact with the conduit bag. Further, frequency and/or possibility of contact with the conduit bag can be reduced by pasting the block member BE so as to include an inclination in a direction approaching a sectional member in an end portion of a pasting region of the block member BE to the upper surface BUS, instead of being parallel to the upper surface of the elastic member (not shown in the drawings).

The coupling portion TE is disposed so as to pass through an inner side of a contour of the block member when the supporting member is in a curved shape. For example, the coupling portion includes a flexure point TEB as shown in the drawing on the upper surface BUS. In other words, when the supporting member is in the curved shape, the coupling portion TE passes through an optional point TP1 on the block member and a point TP2 on the end surface of the block member, and a distance from TP2 to the upper surface of the elastic member is smaller than a distance from TP1 to the upper surface of the elastic member. By providing a bent portion of the coupling portion TE so as to approximate a shape of the elastic member during curving, instead of forming the coupling portion TE on the upper surface BUS of the block member BE, the remainder can be shortened, and a risk or the like of biting between the block members can be reduced.

As long as the coupling portion is a member having an elastic modulus so as not to prevent the occurrence of flexure, that is, a member in a range where a curvature limit can be prescribed, a member having relatively low elasticity, such as a spring or rubber, can be applied. Further, the coupling portion is not limited to formation on the upper surface of the block member, and may be formed in an interior, a side surface, or a bottom surface (the escaping portion BEP).

For example, when the block member BE is mounted on the elastic member EE and then the supporting member is formed into a shape having the prescribed minimum radius of curvature, the coupling portion is pasted so as to straddle the plurality of block members, so that the configuration of this example can be obtained. In addition, the coupling portion in a state of including a clearance corresponding to the remainder may be pasted to the supporting member in a linear shape, or the block member coupled in advance by the coupling portion may be mounted to the elastic member EE.

Figure 13:
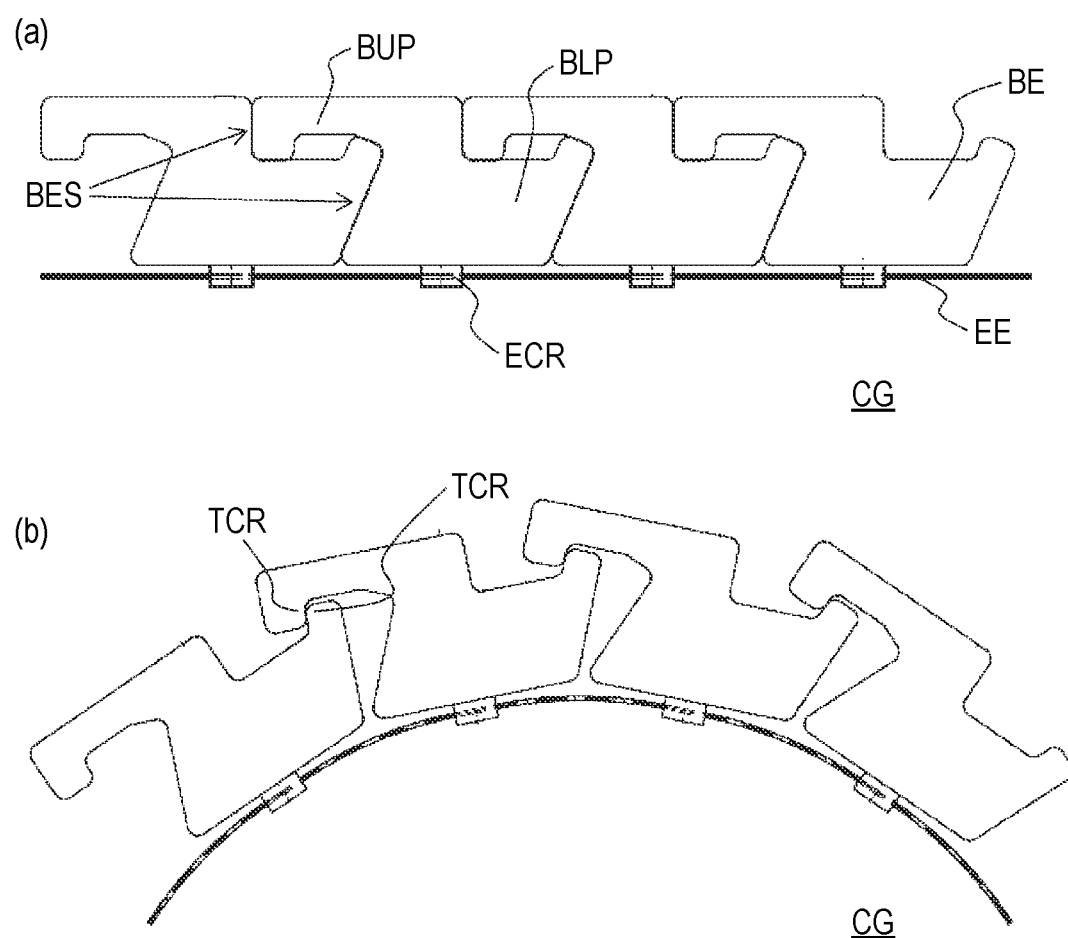
FIG. 13 is a view conceptually showing a tenth example of the supporting member of the present invention.

FIG. 13 is a view conceptually showing a tenth example of the supporting member of the present invention. In this example, the block member BE has a body portion which is a region on the contact region ECR of the elastic member EE, and the coupling portion TE includes a cantilever-shaped one end side extension portion BUP extending from the body portion of the block member in the longitudinal direction of the supporting member. By using the coupling portion whose shape is fixed in this way, it is possible to obtain a supporting member in which the curvature limit is prescribed stably. Further, the number of steps at the time of assembly of the supporting member can be reduced. The one end side extension portion BUP is made from the same material as that of the block member BE and is preferably formed integrally with the block member BE. In such a configuration, since the block member BE does not include a bonding interface such as an adhesive surface, a supporting member having excellent reliability and durability and high dimensional stability can be obtained.

As shown in (a) of FIG. 13, the one end side extension portion BUP extends to a position overlapping with another block member adjacent to one end side of the block member. The one end side extension portion BUP includes an abutment region TCR on a region overlapping with another block member. As shown in (b) of FIG. 13, when the supporting member is largely curved and a distance D between the one block member and the another block member reaches a predetermined size, the abutment region TCR abuts against the abutment region TCR of the another block member and limits the distance D so as not to increase further.

As a result, the radius of curvature of the supporting member CG is limited so as not to be equal to or lower than a certain value, including local ones, that is, the supporting member CG that reduces occurrence of flexure and has excellent durability and reliability is provided.

As shown in (a) and (b) of FIG. 13, the block member BE may extend in the longitudinal direction of the supporting member from the body portion on the other end side of the block member BE, and may include the other end side extension portion BLP including the abutment region TCR. The abutment region TCR of the one end side extension portion BUP abuts against the abutment region TCR formed in the other end side extension portion BLP of the adjacent block member, thereby limiting the amount of curvature to a certain value or less.

As shown in FIG. 13, one of one end side extension portion and the other end side extension portion is preferably formed in a region above the block member (a side far from the elastic member EE), and the other is preferably formed below the block member (a side close to the elastic member EE). This makes it possible to achieve both the strength of the block member and wear reduction of the extension portion. However, the present invention is not limited thereto, and respective extension portions may be arranged in a transverse line in parallel with the upper surface of the elastic member EE, or a positional relationship in which one extension portion is interposed between the other extension portions may be used.

It is preferable that the abutment region TCR formed on one end side of the block member and the abutment region TCR formed on the other end side respectively have surfaces parallel to each other. For example, when the supporting member is curved, in a case where a rotational deviation occurs as viewed from a linear direction of the upper surface of the elastic member EE in a certain block member, the abutment region TCR is in contact with the abutment region TCR of the adjacent block member, and the mutually parallel surfaces are in dose contact with each other to correct the rotational deviation. In this way, a supporting member having high operation accuracy is provided.

In this example, the end surface BES of the block member BE that prescribes the linear shape of the supporting member CG is formed on the side surface of the block member body portion and the apical surface of the one side extension portion BUP. However, in the linear shape, both of them do not necessarily need to be in contact with the adjacent block members, and either one of them may be in a shape in contact. In this example, the side surface of the block member body portion, which is expected to have a large thickness and a small amount of deformation with respect to the compressive stress, is preferably the end surface BES that prescribes the linear shape of the supporting member CG.

In this example, the contact region ECR in contact with the block member BE in the upper surface of the elastic member EE is formed only of the fixed region ECR1 whose deformation is restricted by being fixed to the bottom surface of the block member. Even when the contact region ECR does not include the semi-fixed region ECR2, the coupling portion TE acting as the curvature limit prescribing portion of the supporting member prescribes the minimum radius of curvature of the supporting member, whereby a supporting member having high durability and reliability can be obtained. However, it goes without saving that even higher durability and reliability can be obtained by including the semi-fixed region ECR2.

When the supporting member CG has a curvature limit prescribed by the coupling portion TE, the abutment region of a certain block member and the abutment region of the adjacent block member are parallel to each other, so that occurrence of wear or damage can be reduced. In other words, as shown in (a) and (b) of FIG. 13, the two abutment regions TCR of the respective block members BE may include contact surfaces that are not parallel to each other, and an intersection line of each contact surface may be included in a position far from the bottom surface side of the block member and the generally bottom surface as viewed from the block member. Alternatively, the general intersection line is preferably positioned farther from the lower surface of the elastic member EE as viewed from the block member.

Figure 14:
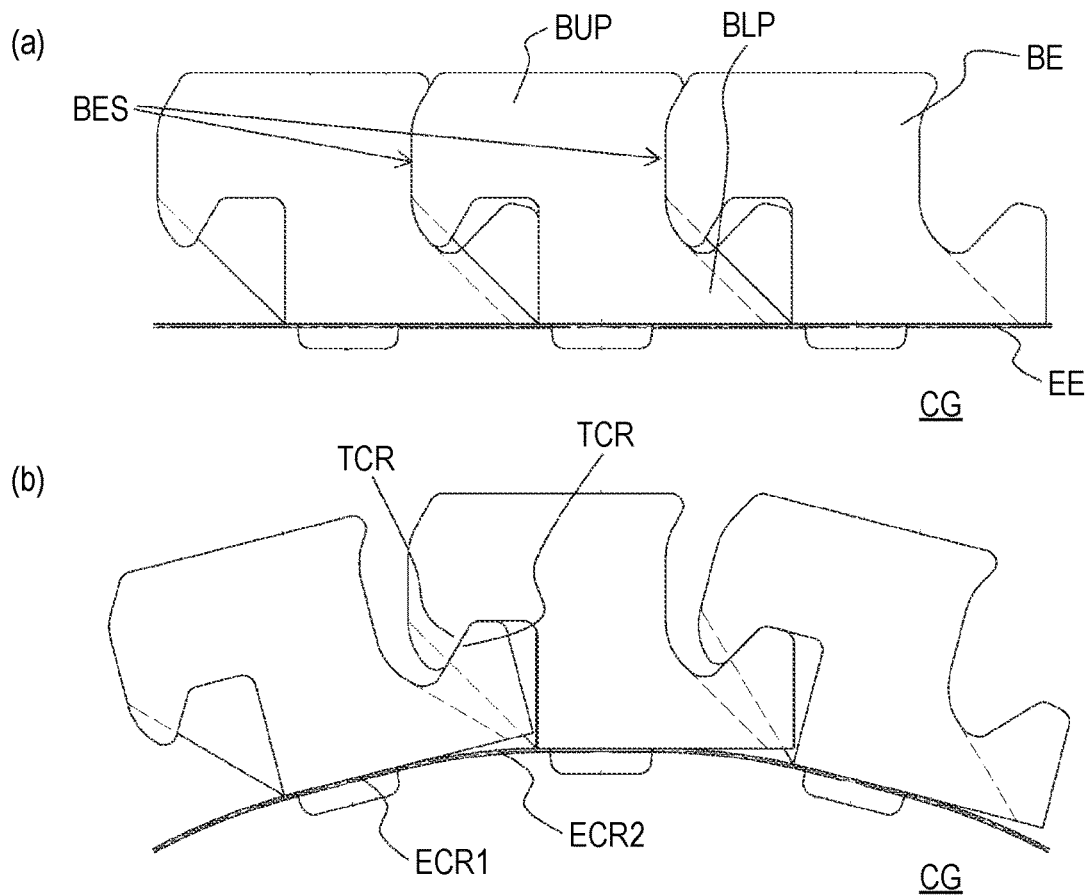
FIG. 14 is a view conceptually showing an eleventh example of the supporting member of the present invention.

(a) and (b) of FIG. 14 are views conceptually showing an eleventh example of the supporting member of the present invention and represent an optional cross-section of the supporting member CG. In this example, the one end side extension portion BUP is formed thick in a vertical direction in the optional cross-section parallel to the longitudinal direction (first direction) of the supporting member. As a result, the one end extension portion BUP can be utilized as an end surface BES formation region that prescribes a linear shape without being limited to use as the coupling portion TE. The coupling portion TE that prescribes the minimum radius of curvature when the supporting member is curved and the end surface TES prescribing the linear shape are preferably disposed at a position where a distance from the elastic member EE is large. By making the one end extension portion thick, it is possible to dispose the one end extension portion having both ends on the upper surface of the block member. In an optional cross-section perpendicular to the upper surface of the elastic member and parallel to the first direction, when a thickness of the one end extension portion BUP in a direction perpendicular to the upper surface of the elastic member is set as TBUP, TBUP is preferably 30% or more, particularly preferably 45% or more of a maximum thickness of the block member body portion in the same cross-section.

In this example, the end surface of the one end side extension portion BUP includes a perpendicular surface perpendicular to the upper surface of the elastic member EE and a protruded portion including an inclined surface formed above and below the perpendicular surface. The other end of the block member includes a recessed surface having a position and a shape corresponding to the protruded portion. With such a configuration, when the supporting member CG is in a linear shape, it is possible to improve accuracy of the adjacent block member in a height direction.

Figure 15:
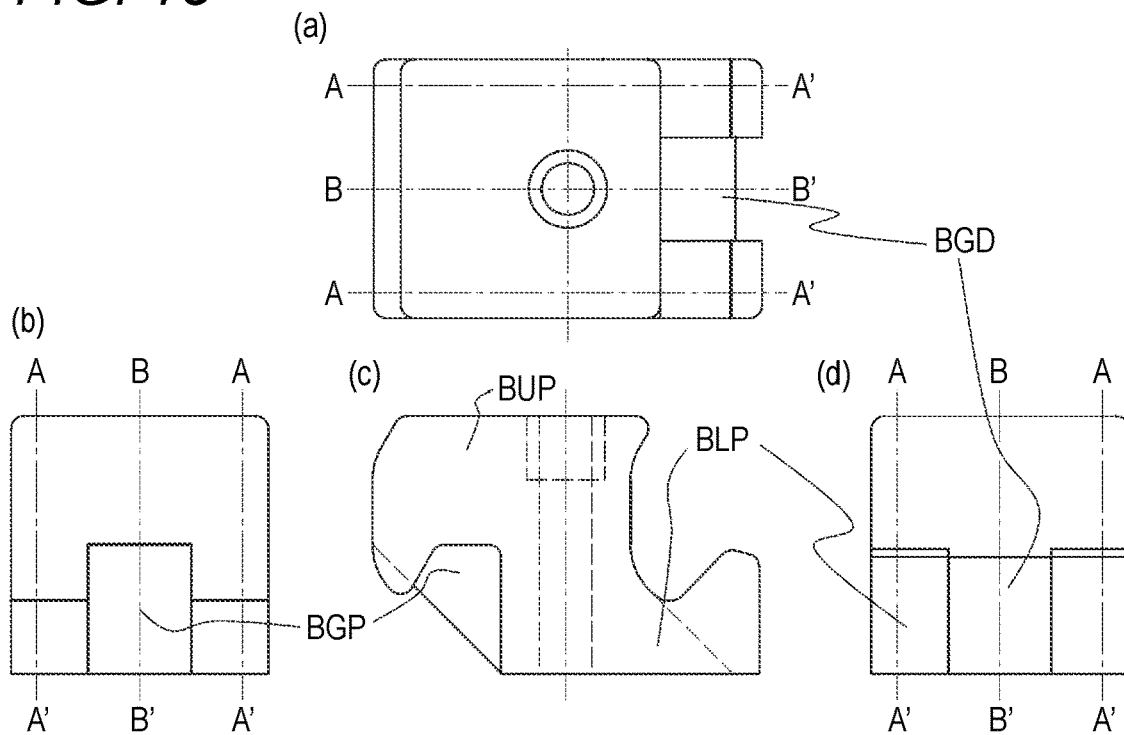
FIG. 15 is a view conceptually showing a block member of the eleventh example of the supporting member of the present invention.
Figure 16:
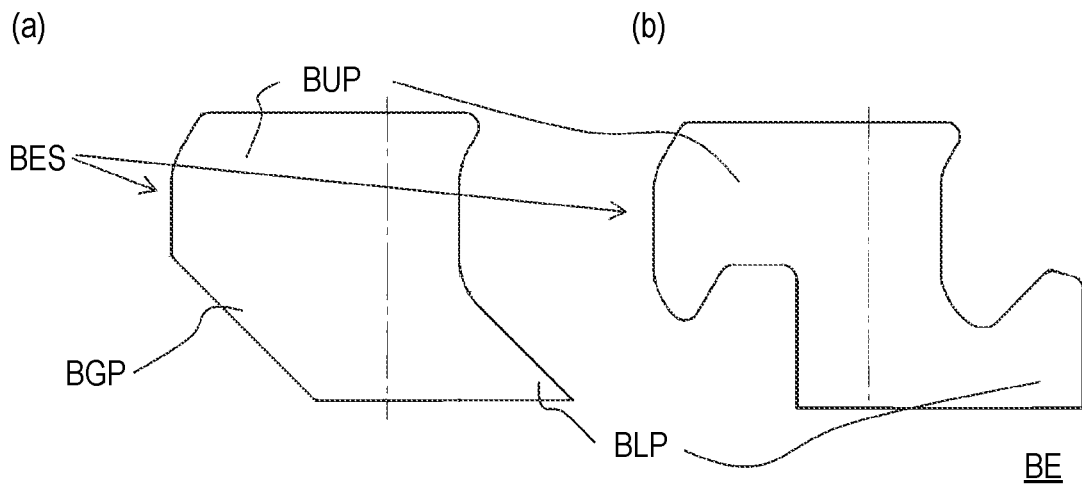
FIG. 16 is a sectional view conceptually showing a block member of the eleventh example of the supporting member of the present invention.

The block member BE of this example will be described with reference to FIG. 15 and FIG. 16. In FIG. 15, (c) is a view of the block member BE of this example viewed from the same direction as in FIG. 14, and when (c) is a front view, (a) is a top view, (b) is a left side view, and (d) is a right side view. (a) of FIG. 16 represents a cross-section of the block member BE at a position of AA' in FIG. 15, and (b) of FIG. 16 represents a cross-section of the block member BE at a position of BB' in FIG. 15. In these drawings, illustration of a lower surface side supporting portion of the block member formed on the elastic member EE and a lower surface side thereof is omitted.

The block member BE includes a guide portion BGP and a guide groove BGD. As shown in (b) and (c) of FIG. 15, the guide portion BGP includes a side wall extending in the vertical direction (a direction intersecting with the bottom surface BBS of the block member). As shown in (a) and (d) of FIG. 15, the guide groove BGD includes a side wall extending in the vertical direction. When assembled as will be described later, a side wall of the guide portion BGP is configured to be approximately parallel to the side wall of the facing guide groove BGD, preferably configured to be perpendicular to the bottom surface of the block member. A width (distance between the side walls) of the guide groove BGD is preferably 1.005 times or more and 1.1 times or less of the width of the guide portion BGP.

The supporting member CG using the block member is assembled such that the guide portion BGP of the block member is inserted into the guide groove BGD of the adjacent block member. In this example, not only when the supporting member is in a linear shape, but also when the supporting member is in a curved shape, at least a part of the guide portion is positioned in the guide groove. Thus, regardless of the shape of the supporting member, it is possible to reduce positional deviation and rotational deviation between the block members. When a movement stroke of the supporting member is more than 2 m, side toppling of the conduit supporting device CU may occur due to a weight of a conduit to be mounted. In contrast, by having the configuration of this example, even if a long stroke is more than 2 m, the risk of side toppling can be reduced.

Figure 17:
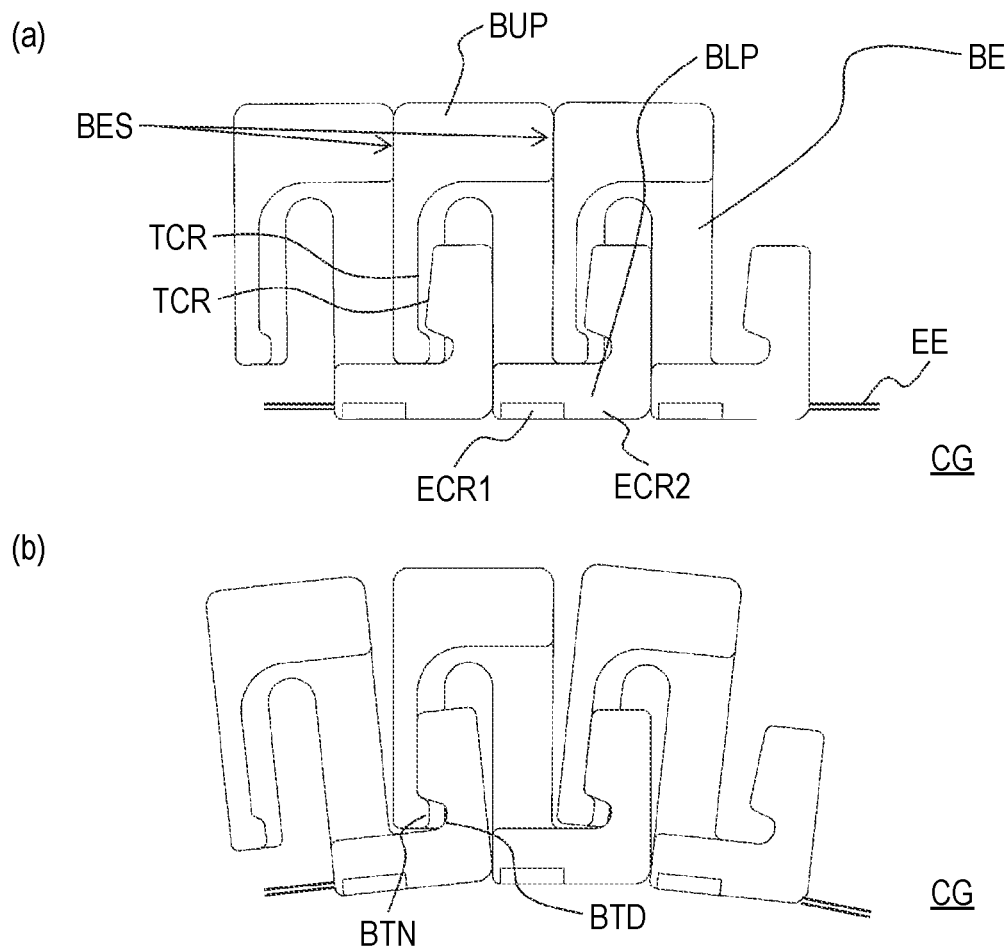
FIG. 17 is a view conceptually showing a twelfth example of the supporting member of the present invention.
Figure 18:
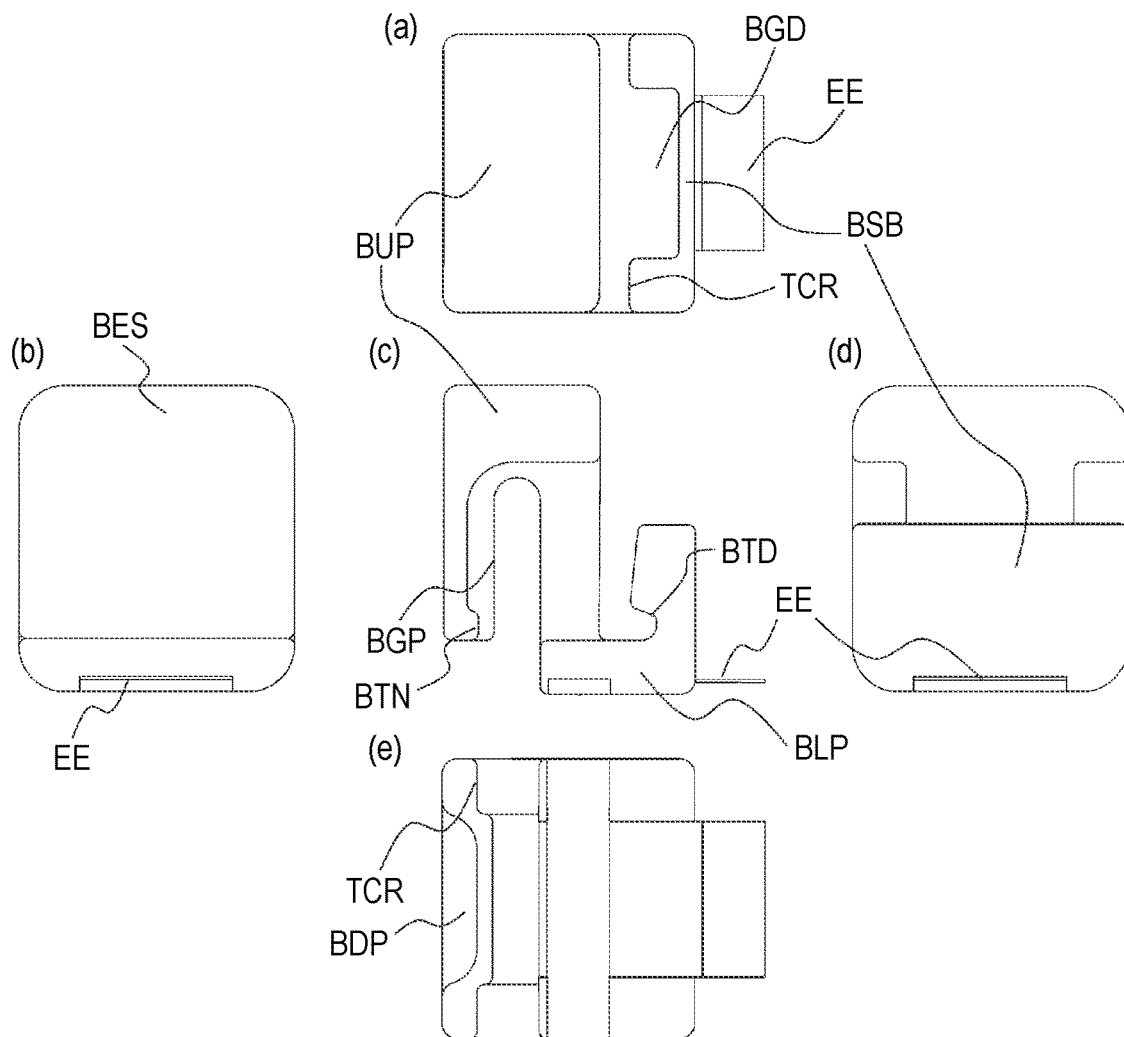
FIG. 18 is a view conceptually showing a block member of the twelfth example of the supporting member of the present invention.
Figure 19:
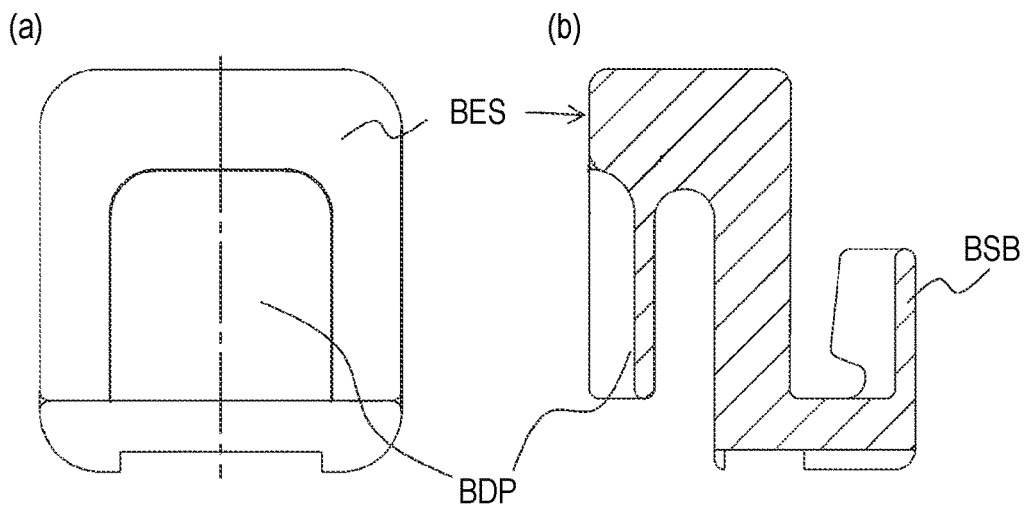
FIG. 19 is a sectional view conceptually showing a block member of the twelfth example of the supporting member of the present invention.

A twelfth example of the present invention will be described with reference to FIG. 17, FIG. 18, and FIG. 19. (a) of FIG. 17 represents the supporting member CG in a linear shape, and (b) of FIG. 17 represents the supporting member CG in a curved shape. FIG. 18 represents a single block member BE (including the elastic member EE), and when (c) of FIG. 18 is a front view, (a) is a top view, (b) is a left side view, (d) is a right side view, and (e) is a bottom view. (a) of FIG. 19 is a view for explaining a thin portion BDP formed on a surface of the left side surface, and (b) of FIG. 19 shows a sectional view at a position of a dash-dot line in (a) of FIG. 19.

In this example, the block member BE includes an extension region vertically provided downward at an apex of the one end side extension portion BUP. One end side surface of the extension region includes the end surface BES, and as shown in (a) of FIG. 17, when the supporting member CG has a linear shape, the end surface BES abuts against the end surface of the adjacent block member BE. The block member BE includes an extension region vertically provided upward at an apex of the other end side extension portion BLP.

The extension region on one end side includes the abutment region TCR on a surface opposite to the end surface BES. The extension region on the other end side also includes another abutment region TCR. As shown in (b) of FIG. 17, when the supporting member CG has maximum curvature prescribed in advance, the abutment region TCR on one end side abuts against the abutment region TCR on the other end side of the adjacent block member, thereby reducing further curvature of the supporting member CG.

In this example, a claw portion BTN is formed in the vicinity of an apex of the extension region on one end side, and a receiving portion BTD is formed in the vicinity of a root of the extension region on the other end side. The supporting member CG is assembled such that the claw portion BTN is fitted into the receiving portion BTD of the adjacent block member. Thus, even when an unexpected external stress is applied to the supporting member CG during assembly or the like, it is possible to prevent abutment surfaces facing each other from deviating in the vertical direction.

Referring to (a) of FIG. 17, the extension region on the other end side forms a slit between on an upper portion of the receiving portion BTD and the block member body portion. In a horizontal direction of the drawing, a minimum width of a groove is formed smaller than a maximum thickness of the claw portion BTN. Thus, the abutment surfaces can be more reliably prevented from being deviated in the vertical direction. In the assembly, the block member is elastically deformed, so that insertion and extraction can be made possible without requiring special equipment or work.

As shown in (e) of FIG. 18, (a) of FIG. 19, and (b) of FIG. 19, the thin portion BDP is formed in a part of the extension region formed at the apex of the one end side extension portion BUP. That is, the general extension region includes a thick portion formed near the upper surface of the block member BE and a thin portion formed below the block member BE.

By having the thick portion near the upper surface, it is possible to reduce the weight while maintaining high compressive elasticity. The thin portion may be connected between two adjacent abutment regions TCR. As a result, mechanical strength of the abutment region TCR can be reinforced. The thin portion may be formed between two adjacent claw portions BTN. As a result, workability in fitting during assembly can be improved, and occurrence of microcracks due to a mechanical stress during assembly can be reduced.

The extension region of the other end side extension portion BLP includes a supporting plate BSB. By reinforcing the mechanical strength of the extension region, a stable operation and high durability can be obtained.

Figure 20:
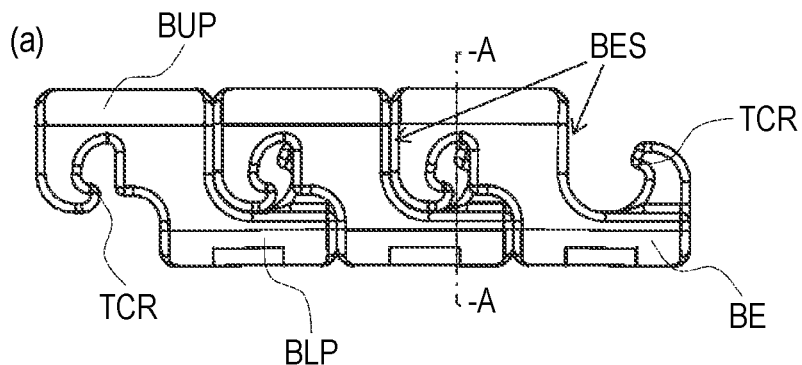
FIG. 20 is a view conceptually showing a thirteenth example of the supporting member of the present invention.
Figure 20:
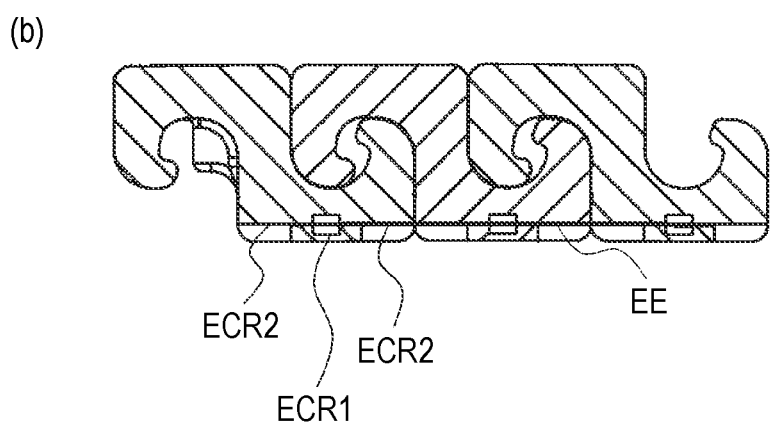
Figure 20:
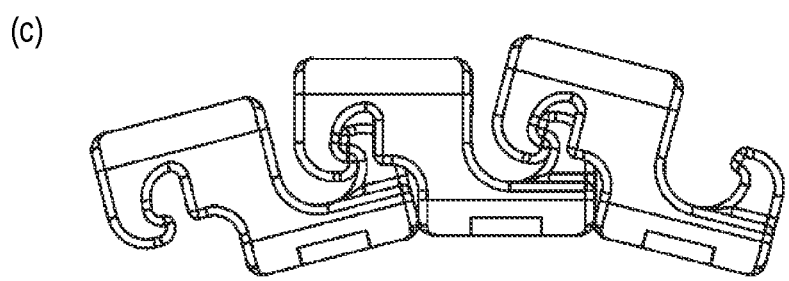
Figure 20:
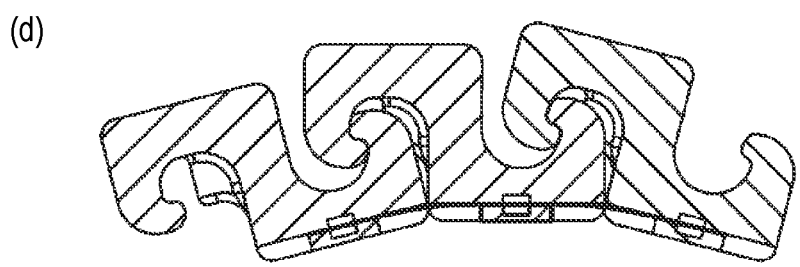
Figure 21:
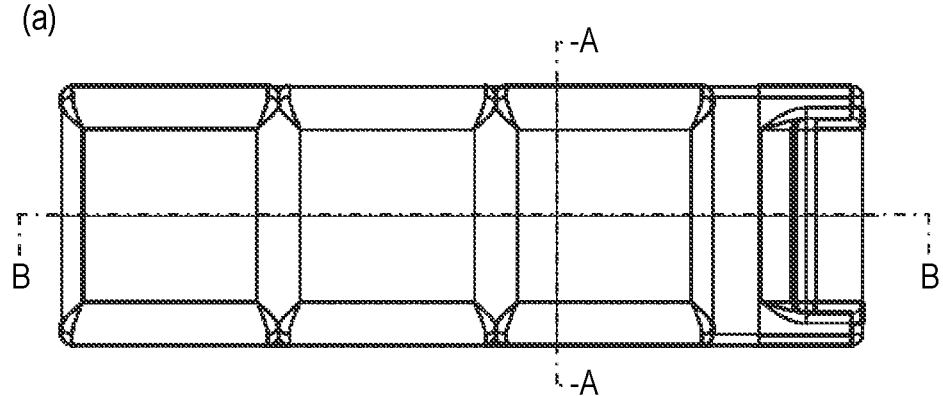
FIG. 21 is a view conceptually showing a thirteenth example of the supporting member of the present invention.
Figure 21:
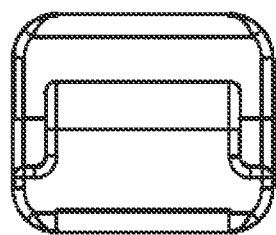
Figure 21:
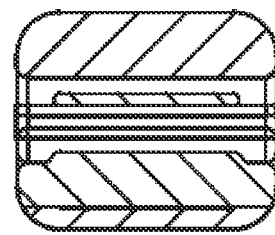

A thirteenth example of the present invention will be described with reference to FIG. 20 and FIG. 21. (a) of FIG. 20 represents the supporting member CG in a linear shape, and (c) of FIG. 20 represents the supporting member CG in a curved shape. (b) and (d) of FIG. 20 are sectional views of the supporting member CG corresponding to (a) and (c) of FIG. 20, respectively. When (a) of FIG. 20 is a front view, (a) of FIG. 21 is a top view, and (b) of FIG. 21 is a right side view. (b) and (d) of FIG. 20 are sectional views at a position of B-B in (a) of FIG. 21, and (c) of FIG. 21 is a sectional view at a position of A-A in (a) of FIG. 20 and (a) of FIG. 21.

The block member BE includes an extension region vertically provided downward at an apex of the one end side extension portion BUP. One end side surface of the extension region includes the end surface BES, and as shown in (a) of FIG. 20, when the supporting member CG has a linear shape, the end surface BES abuts against the end surface BES of the adjacent block member BE. The block member BE includes an extension region vertically provided upward at the apex of the other end side extension portion BLP.

The extension region on one end side includes the abutment region TCR on a surface opposite to the end surface BES. The extension region on the other end side also includes another abutment region TCR. In this example, each extension region has an apex curved inward, and the abutment region TCR is formed on an inner peripheral surface of the curvature. As shown in (c) and (d) of FIG. 20, when the supporting member CG has maximum curvature prescribed in advance, the abutment region TCR on one end side abuts against the abutment region TCR on the other end side of the adjacent block member. These abutment regions prescribe the minimum radius of curvature of the supporting member CG and provide high reliability. In addition, the extension region whose apex is curved inward prevents occurrence of inclination of the block member, and fitting of the abutment region is hard to disengage even when the inclination occurs.

In this example, the block member BE includes a pair of plate-shaped portions formed from the body portion of the block member BE to the BUP. In a region surrounded by the pair of plate-shaped portions, one end side extension region, and the block member body portion, an extension region erected upward is inserted into the apex of the other end side extension portion BLP. Inner wall surfaces of the pair of plate-shaped portions appropriately control an operation of the other end side extension region, thereby reducing bending or twisting of the supporting member.

In this example, the fixed region ECR1 is formed not in the body portion of the block member BE but on the lower surface of the other end side extension portion BLP.

Figure 22:
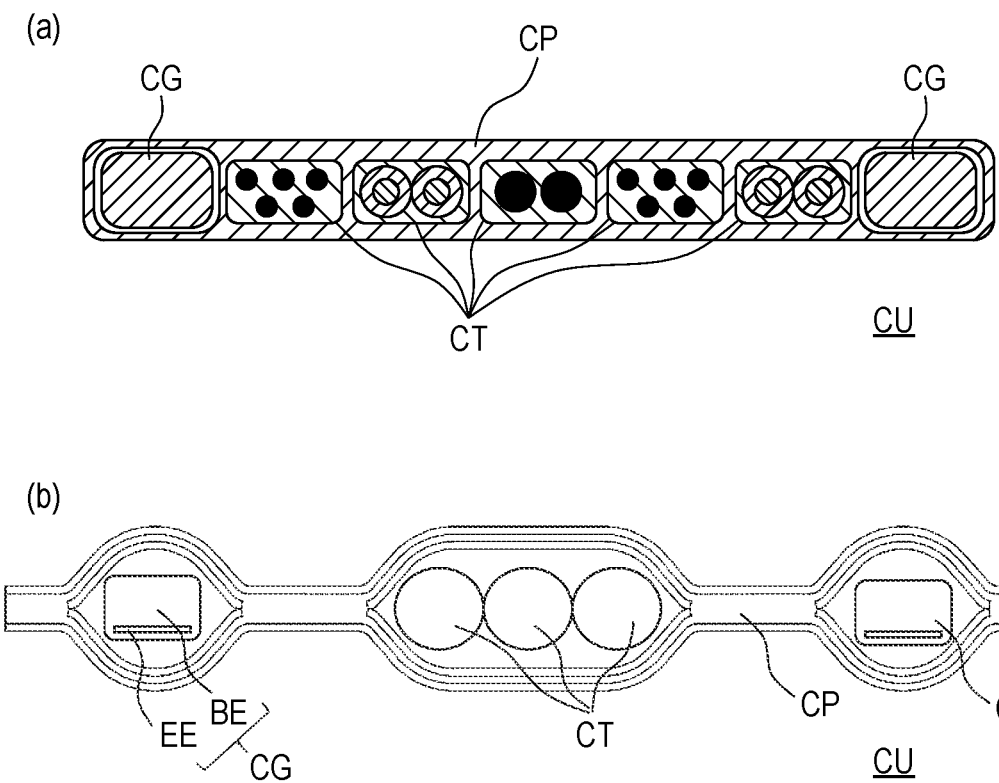
FIG. 22 is a sectional view conceptually showing a conduit supporting device of the present invention.

(a) and (b) of FIG. 22 are sectional views conceptually showing an example of the conduit supporting device CU using the supporting member CG. The conduit supporting device includes a conduit bag CP having a plurality of insertion paths. The supporting member CG is inserted into the insertion path at both ends of the cross-section of the conduit bag CP, and the conduit CT is inserted into each insertion path therebetween to form an integrated flat conduit supporting device CU. The conduit bag CP is made from a fluorine resin (PTFE or the like) in which generation of vinyl chloride or dust is reduced. The conduit bag CP may be formed of a composite material to which a plurality of resin films are pasted. The insertion path of the supporting member is not limited to on both ends and may be an insertion path positioned between a plurality of conduits CT, and the number of insertion of the supporting member may be one or three or more. The number of conduits in each insertion path and the number of insertion paths through which the conduits are inserted may be an optional number. In addition, for the conduit, a cable for transmitting electrical energy and a tube for transmitting fluid may be present alone or in combination. Further, the conduit supporting device CU is not limited to a flat type as shown in the drawing, and even in a tubular shape or the like, the supporting member CG can be applied.

In addition, the conduit CT and the supporting member CG may be inserted into the insertion path of the conduit bag CP formed in advance, and the conduit CT and the conduit supporting member CG may be configured by lamination. Alternatively, a part of the conduit CT and the conduit supporting member CG may be configured by lamination, and the remaining part may be inserted.

Figure 23:
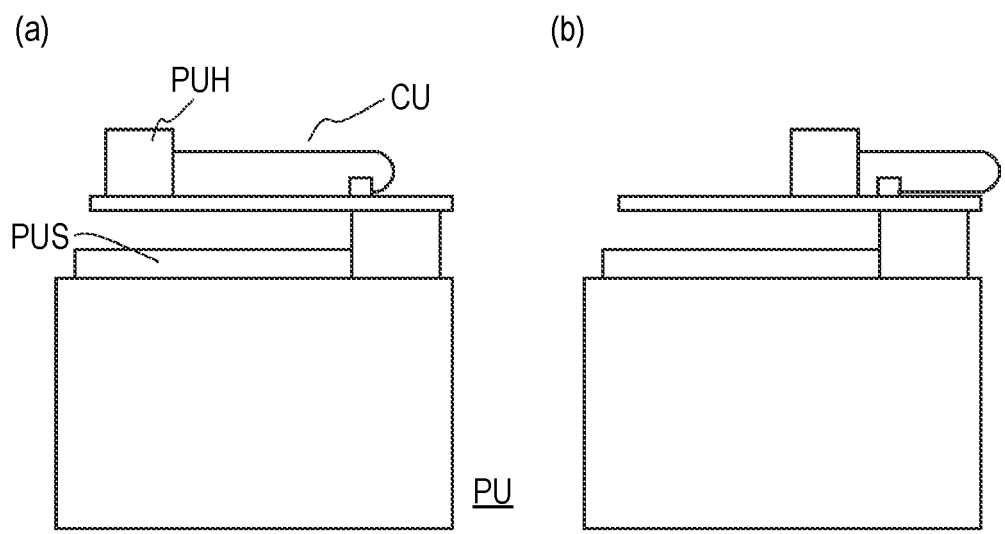
FIG. 23 is a view conceptually showing a processing apparatus of the present invention.

FIG. 23 is a view conceptually showing an example of a processing apparatus PU including the conduit supporting device CU. The processing apparatus PU includes a stage PUS on the body, and an object to be processed (not shown in the drawings) is disposed on the stage PUS. As shown in (a) and (b) of FIG. 23, the processing apparatus PU includes a processing head PUH that is movable relatively to the object to be processed. One end of the conduit supporting device CU is connected to the body of the processing apparatus as a fixed end, and the other end is connected to the processing head PUH. In accordance with a position of the processing head PUH, a position corresponding to a U-shaped curved portion moves, and a length of two facing linear portions changes, so that stable connection between the body and the processing head PUH can be maintained.

In the conduit supporting device CU of the present invention, a product of high quality can be obtained since dropping, positional deviation, or the like due to damage of the supporting member does not occur. In addition, since deterioration of the elastic member EE is reduced by including the time of operation and the time of stop of the processing apparatus PU, a processing apparatus PU having little stop time for maintenance and high productivity can be provided. Furthermore, since vibration during movement of the processing head is reduced, excellent productivity can be obtained even in processing where high positional accuracy is required.

The object to be processed may be, for example, a sheet/plate material such as a semiconductor wafer or a flat panel display or may be a three-dimensional structure such as a mechanical component. Examples of the processing head PUH include a gripping unit that grips an object to be processed for conveyance, a processing unit for physically and/or chemically processing an object to be processed, or an electromagnetic wave irradiation/detection unit that irradiates an object to be processed with electromagnetic waves or detects electromagnetic waves from the object to be processed. The conduit supporting device CU is formed in a U shape such that the elastic member of the inner supporting member CG is inside the block member. A region corresponding to a linear portion of the U shape can have a length of, for example, 0.1 m to 5 m according to the position of the processing head. In this example, a maximum moving distance (stroke) of the processing unit is 3 m, and the conduit supporting device CU is formed to follow the distance. A radius of curvature of curvature at a position corresponding to a curved portion of the U shape is preferably 0.02 m or more and 0.3 m or less. In addition, a region corresponding to the upper linear portion of the U shape of the conduit supporting device CU may be slightly deflected downward due to its own weight when the apparatus is stopped, but an amount of deflection of the supporting device is preferably 50 mm or less, particularly preferably 30 mm or less. Here, the deflection amount of the supporting device is a maximum value of a distance from a straight line connecting a position where the conduit supporting device is connected to the processing head PUH and a position of a boundary (inflection point) between the curved portion and the linear portion of the U shape to an optional point on the upper surface of the conduit supporting device.

Further, the conduit supporting device CU is not limited to use in a direction in which a direction of gravity intersects with the linear portion as shown in the drawing, and may be used in a direction where directions of the linear portion and gravity are parallel to each other. At this time, the curved portion may be above or below the linear portion.

As described above, in the conduit supporting device CU including the supporting member CG, breakage of the elastic member is reduced, and high reliability is provided. Further, in the processing apparatus including such a conduit supporting device CU, not only breakage is reduced, but stain of an object to be processed or environment due to dust or leakage caused by breakage is also reduced, or processing efficiency can be improved by a long moving stroke and a long life.

INDUSTRIAL APPLICABILITY

The supporting member, the conduit supporting device, and the processing apparatus according to the present invention can be applied to, for example, a robot traveling device assembled to a machining line, a semiconductor manufacturing apparatus, a flat panel display manufacturing apparatus, an electronic component mounting apparatus, and the like.

The invention claimed is:
1. A supporting member comprising:
an elastic member having a first surface; and
a plurality of block members each of which has a contact portion which is in contact with the first surface of the elastic member, wherein
the plurality of block members are linearly arranged on the first surface of the elastic member along an extending direction of the elastic member in which the elastic member extends,
the supporting member is deformable from a first shape into a second shape in which the supporting member is curved to have a larger curvature than a curvature of the first shape, and
the contact portion of each of the plurality of block members comprises
a first contact portion of which a distance from the first surface is not changed according to the deformation of the supporting member, and
a second contact portion of which a distance from the first surface is changed according to the deformation of the supporting member.
2. The supporting member according to claim 1, wherein a distance between the second contact portion of each of the plurality of block members and the first surface of the elastic member in the first shape is smaller than a distance between the second contact portion of the each of the plurality of block members and the first surface of the elastic member in the second shape.
3. The supporting member according to claim 1, wherein a distance between adjacent two of the plurality of block members in the extending direction of the elastic member in the first shape is smaller than a distance between adjacent two of the plurality of block members in the extending direction of the elastic member in the second shape.
4. The supporting member according to claim 1, wherein the plurality of block members include a first block member and a second block member adjacent to the first block member,
each of the first block member and the second block member has an end surface,
the end surface of the first block member is in contact with the end surface of the second block member when the supporting member is in the first shape, and
the end surface of the first block member is separated from the end surface of the second block member when the supporting member is in the second shape.
5. The supporting member according to claim 4, wherein the end surface of the first block member has a protruded portion,
the end surface of the second block member has a recessed portion, and
the protruded portion of the first block member is engaged with the recessed portion of the second block member when the supporting member is in the first shape.
6. The supporting member according to claim 1, wherein the plurality of block members include a first block member and a second block member adjacent to the first block member,
the first block member has a guide portion having a side wall extending in a direction intersecting with a bottom surface of the first block member,
the second block member has a guide groove having a side wall extending in a direction intersecting with a bottom surface of the second block member,
the supporting member is configured so that the guide portion of the first block member is inserted into the guide groove of the second block member, and at least a part of the guide portion of the first block member is positioned in the guide groove of the second block member when the supporting member is in the first shape and when the supporting member is in the second shape.

7. The supporting member according to claim 1, wherein the elastic member has a second surface which is a surface opposite to the first surface, and a third surface provided between the first surface and the second surface,
each of the plurality of block members has a side surface supporting portion which is opposed to the third surface of the elastic member, and
the side surface supporting portion is provided at least at a position adjacent to the second contact portion.

8. The supporting member according to claim 1, wherein the elastic member is a plate-shaped member having a thickness of 0.1 mm or more and having a property as a spring.

9. The supporting member according to claim 1, wherein the elastic member is a plate-shaped member which causes breakage when the plate-shaped member is curved to have a radius of curvature of 5 mm or less.

10. The supporting member according to claim 1, wherein the elastic member has such a flexibility that breakage does not occur even if the elastic member is stretched and deformed 10,000 times between a curved shape having a radius of curvature of 100 mm and a linear shape.

11. The supporting member according to claim 1, wherein each of the plurality of block members comprises a polymer material.

12. The supporting member according to claim 11, wherein the polymer material is a material having a compressive elastic modulus of 1000 MPa or more.

13. The supporting member according to claim 1, wherein the supporting member further comprises a high rigidity layer, which has an elastic modulus higher than an elastic modulus of each of the plurality of block members, on the each of the plurality of block members.

14. The supporting member according to claim 13, wherein the high rigidity layer is formed so as to increase a compressive elastic modulus of the each of the plurality of block members against a compressive stress in a direction parallel to the extending direction of the elastic member.

15. The supporting member according to claim 1, wherein the elastic member has a second surface which is a surface opposite to the first surface,
the supporting member further comprises a supporting portion which is provided at a side of the second surface of the elastic member so that the elastic member is sandwiched between the supporting portion and one of the plurality of block members, and
a distance between an upper surface, which is at a side of the elastic member, of the supporting portion and the first contact portion of the one of the plurality of block members is smaller than a distance between the upper surface of the supporting portion and the second contact portion of the one of the plurality of block members.

16. The supporting member according to claim 1, wherein each of the plurality of block members comprises a top plate which is a metal plate,
the top plate has a first side parallel to the extending direction of the elastic member and a second side extending in a direction intersecting with the first side of the top plate,
the top plate has a post which extends from the second side of the top plate toward the elastic member, and
a leading end of the post is capable of being in contact with the first surface of the each of the plurality of block members when the supporting member is in the first shape.

17. The supporting member according to claim 1, wherein the plurality of block members include a first block member and a second block member adjacent to the first block member, and
the supporting member further comprises a coupling portion which couples the first block member and the second block member so that a radius of curvature of the supporting member is limited to be more than a predetermined value.

18. A conduit supporting device comprising: the supporting member according to claim 1; a conduit; and a conduit bag into which the supporting member and the conduit are inserted.

19. The conduit supporting device according to claim 18, wherein
the conduit comprises at least one of a cable for transmitting electrical energy or a tube for transmitting fluid.

20. The conduit supporting device according to claim 18, wherein
the conduit bag is formed of a composite material in which a plurality of resin films are pasted.

21. The conduit supporting device according to claim 18, wherein
the conduit bag comprises a fluorine resin.

22. A processing apparatus comprising: the conduit supporting device according to claim 18.

23. The processing apparatus according to claim 22, further comprising
a stage on which an object to be processed is to be disposed; and
a processing head which is movable relatively to the object to be processed and is configured to grip the object to be processed or perform a physical processing, a chemical processing, an electromagnetic wave irradiation or an electromagnetic wave detection to the object to be processed, wherein
the conduit supporting device comprises a region having a linear shape and a region having a curved shape, and
a length of the region having a linear shape changes according to the relative movement.

* * * * *